US009919687B2

United States Patent
Kamiya et al.

(10) Patent No.: US 9,919,687 B2
(45) Date of Patent: Mar. 20, 2018

(54) HYDRAULIC BRAKING SYSTEM

(71) Applicants: TOYOTA JIDOSHA KABUSHIKI KAISHA, Toyota-shi, Aichi (JP); ADVICS CO., LTD., Kariya, Aichi (JP)

(72) Inventors: Yusuke Kamiya, Okazaki (JP); Masaaki Komazawa, Miyoshi (JP); Kiyoyuki Uchida, Konan (JP); Masaki Ninoyu, Obu (JP); Akitaka Nishio, Kariya (JP); Masaki Maruyama, Nagoya (JP)

(73) Assignees: TOYOTA JIDOSHA KABUSHIKI KAISHA, Toyota (JP); ADVICS CO., LTD., Kariya (JP)

( * ) Notice: Subject to any disclaimer, the term of this patent is extended or adjusted under 35 U.S.C. 154(b) by 0 days.

(21) Appl. No.: 14/902,664

(22) PCT Filed: May 12, 2014

(86) PCT No.: PCT/JP2014/062609
§ 371 (c)(1),
(2) Date: Jan. 4, 2016

(87) PCT Pub. No.: WO2015/008525
PCT Pub. Date: Jan. 22, 2015

(65) Prior Publication Data
US 2016/0200301 A1    Jul. 14, 2016

(30) Foreign Application Priority Data

Jul. 18, 2013    (JP) .................................. 2013-149094

(51) Int. Cl.
B60T 8/40        (2006.01)
B60T 7/04        (2006.01)
(Continued)

(52) U.S. Cl.
CPC ................ B60T 7/042 (2013.01); B60T 1/10 (2013.01); B60T 8/4077 (2013.01);
(Continued)

(58) Field of Classification Search
CPC .... B60T 8/4077; B60T 13/146; B60T 13/686; B60T 7/042
See application file for complete search history.

(56) References Cited

U.S. PATENT DOCUMENTS

| 6,913,326 B1 | 7/2005 | Ohkubo et al. |
| 2012/0074771 A1 | 3/2012 | Vollert et al. |

(Continued)

FOREIGN PATENT DOCUMENTS

| JP | 2000-159094 A | 6/2000 |
| JP | 2009-292176 A | 12/2009 |

(Continued)

Primary Examiner — Xuan Lan Nguyen
(74) Attorney, Agent, or Firm — Oliff PLC

(57) ABSTRACT

Vibrations of a hydraulic pressure in an upstream portion due to operations of a slip control device during anti-lock control are transmitted to a control pressure chamber via a pressurizing piston of a master cylinder and a control piston of a regulator. During anti-lock control, in contrast, a pressure-increase linear valve and a pressure-reduction linear valve are opened, allowing change in volume of the control pressure chamber, resulting in reduction in stiffness. This reduction suppresses vibrations of a hydraulic pressure in the control pressure chamber, resulting in suppression of vibrations of a hydraulic pressure in a front pressure chamber. As a result, it is possible to reduce the lowering in control accuracy for a hydraulic pressure in a brake cylinder in anti-lock control using the hydraulic pressure in the front pressure chamber, which can well avoid a long braking distance.

13 Claims, 12 Drawing Sheets

(51) Int. Cl.
   *B60T 1/10*     (2006.01)
   *B60T 13/14*    (2006.01)
   *B60T 13/66*    (2006.01)
   *B60T 13/68*    (2006.01)
   *F16D 61/00*    (2006.01)
   *B60T 8/42*     (2006.01)

(52) U.S. Cl.
   CPC .......... *B60T 8/4081* (2013.01); *B60T 8/4291* (2013.01); *B60T 13/146* (2013.01); *B60T 13/662* (2013.01); *B60T 13/686* (2013.01); *F16D 61/00* (2013.01); *B60T 2270/604* (2013.01)

(56) References Cited

U.S. PATENT DOCUMENTS

2013/0111897 A1   5/2013   Kuhlman
2013/0318964 A1   12/2013  Isono

FOREIGN PATENT DOCUMENTS

JP   2012-192767 A   10/2012
WO   2012/114510 A1   8/2012

FIG.2
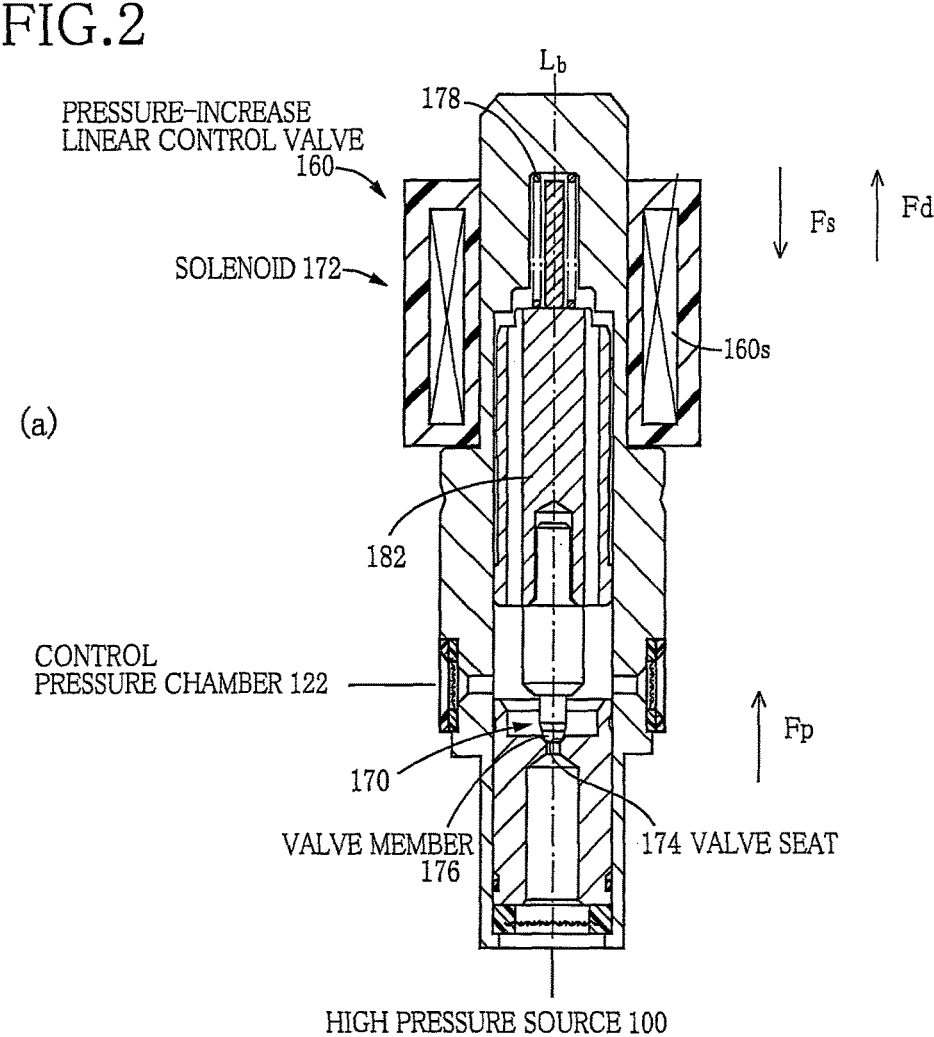
(a)
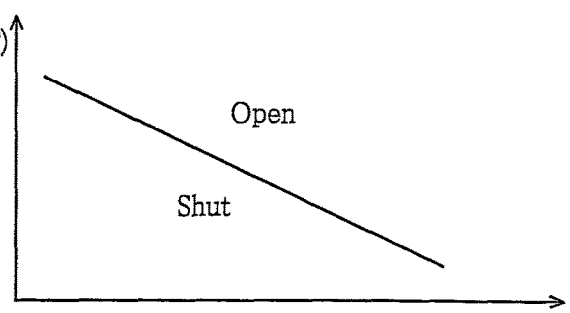
(b)

FIG.3
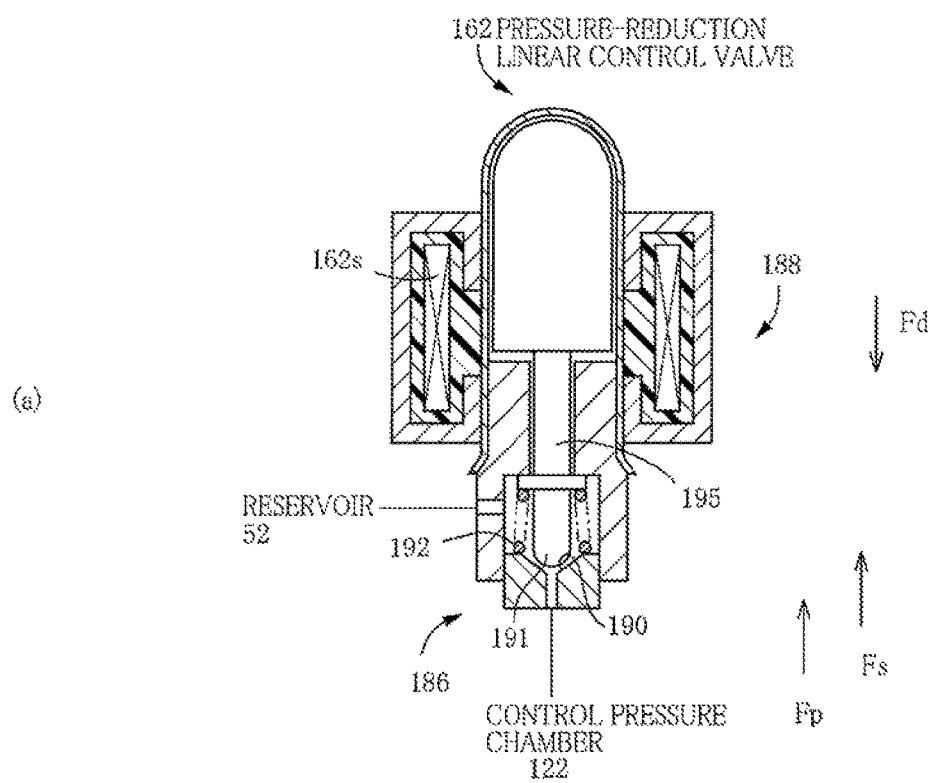
(a)
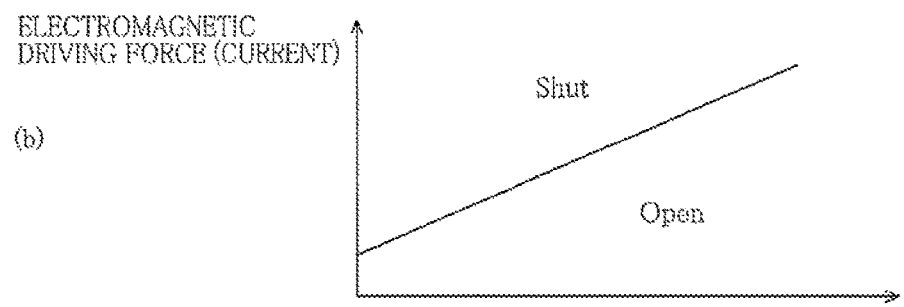
(b)

FIG.6
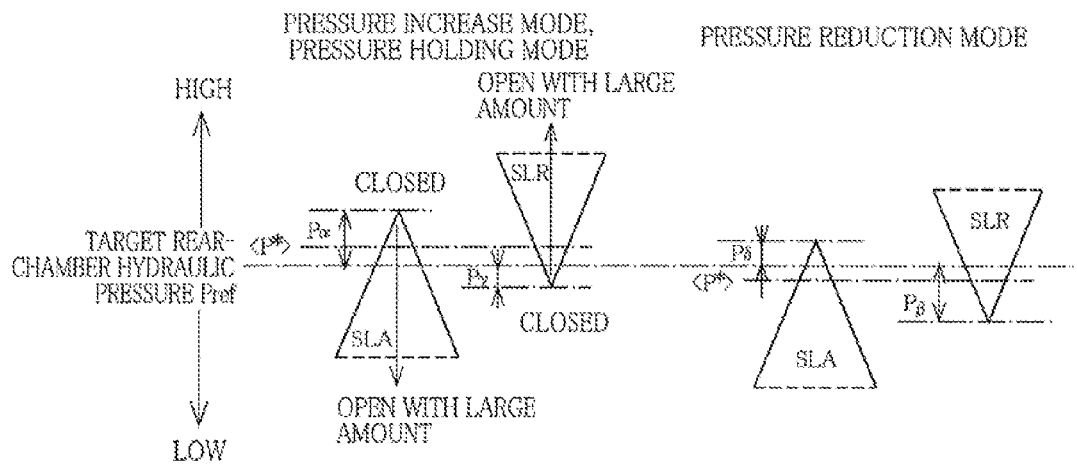
(a) IN ABS CONTROL
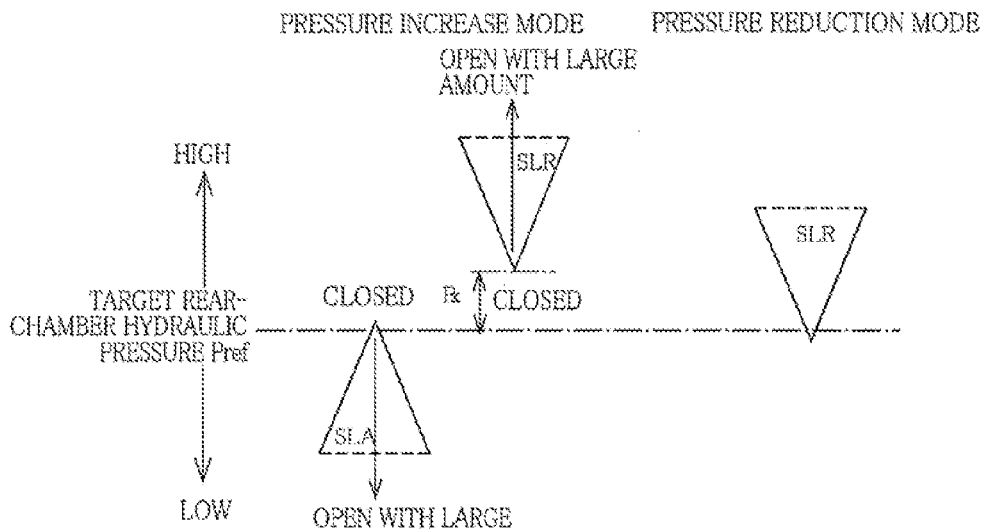
(b) IN NORMAL BRAKING
SLA: PRESSURE-INCREASE LINEAR VALVE
SLR: PRESSURE-REDUCTION LINEAR VALVE

US 9,919,687 B2

HYDRAULIC BRAKING SYSTEM

TECHNICAL FIELD

The present invention relates to suppression of a vibration of a hydraulic pressure in a hydraulic braking system.

BACKGROUND ART

Patent Document 1 discloses a hydraulic braking system including (i) a plurality of brake cylinders, (ii) a high pressure source including a pump device, (iii) a common passage to which the plurality of brake cylinders and the high pressure source are connected, (iv) a master cylinder connected to brake cylinders for front left and right wheels via respective master cut-off valves, (v) a pressure-increase linear valve and a pressure-reduction linear valve configured to control a hydraulic pressure in the common passage, and (iv) an anti-lock control valve device provided between the common passage and the plurality of brake cylinders and including a plurality of anti-lock control valves.

In the normal braking in this hydraulic braking system, in a state in which the master cylinder is isolated from the respective brake cylinders of the front left and right wheels by the respective master cut-off valves, the pressure-increase linear valve and the pressure-reduction linear valve are controlled to control the hydraulic pressure in the common passage to control hydraulic pressures in the respective plurality of brake cylinders in common. In anti-lock control, the pressure-increase linear valve and the pressure-reduction linear valve control the hydraulic pressure in the common passage, and the plurality of anti-lock control valves control the hydraulic pressures in the respective brake cylinders, individually, but an opening and closing switching pressure of each of the pressure-increase linear valve and the pressure-reduction linear valve is greater than in the normal braking. As a result, the pressure-increase linear valve is opened, and the pressure-reduction linear valve is closed, thereby suppressing change in the hydraulic pressure in the common passage due to opening and closing operations of the anti-lock control valves.

PRIOR ART DOCUMENT

Patent Document

Patent Document 1: JP-A-2012-192767

DISCLOSURE OF THE INVENTION

Object of the Invention

The object of the present invention is to suppress vibrations of a hydraulic pressure in an upstream portion located upstream of a slip control device in a hydraulic braking system.

Means for Achieving Object, and Effects

The invention of the present application relates to a hydraulic braking system including a slip control device configured to control hydraulic pressures in respective brake cylinders to control a slipping state of each wheel. In this hydraulic braking system, a hydraulic-pressure producing device controls a hydraulic pressure in an upstream portion located upstream of the slip control device and suppresses vibrations of the hydraulic pressure in the upstream portion. This suppression of the vibrations of the hydraulic pressure in the upstream portion can reduce lowering in accuracy of control of the slip control device for the hydraulic pressures in respective brake cylinders.

CLAIMABLE INVENTION

There will be described by way of examples inventions recognized to be claimable by the present applicant or features of the invention.

(1) A hydraulic braking system, comprising:
a plurality of brake cylinders respectively provided for a plurality of wheels of a vehicle;
a hydraulic-pressure producing device; and
a slip control device provided between the hydraulic-pressure producing device and the plurality of brake cylinders and configured to control a hydraulic pressure in each of at least one of the plurality of brake cylinders to control a slipping state of each of the plurality of wheels,
the hydraulic-pressure producing device comprising a stiffness reducer configured to reduce stiffness in an upstream portion located upstream of the slip control device such that the stiffness is less in a case where the slip control device is in an operating state than in a case where the slip control device is in a non-operating state.

Reduction in the stiffness in the upstream portion can absorb vibrations due to operations of the slip control device, resulting in suppression of the vibrations.

A stiffness K is a value obtained by dividing an amount of increase $\Delta Fp$ in force applied to the upstream portion (i.e., force produced by a hydraulic pressure), by an amount of change $\Delta q$ in volume of the upstream portion ($K=\Delta Fp/\Delta q$). The volume of the upstream portion is more easily changed with a small force in the case where the stiffness K is low than in the case where the stiffness K is high, so that the vibrations are more easily absorbed. Thus, the stiffness in the upstream portion is reduced, thereby well absorbing the vibrations due to the operations of the slip control device.

It is noted that the slip control device may individually control the respective hydraulic pressures in the plurality of brake cylinders and may control the respective hydraulic pressures in the two brake cylinders in common.

(2) The hydraulic braking system according to the above form (1),
wherein the hydraulic-pressure producing device comprises (i) a master cylinder comprising (a) a pressurizing piston fluid-tightly and slidably fitted in a housing, (b) a front pressure chamber provided in front of the pressurizing piston and connected to the upstream portion, and (c) a rearward chamber provided at a rear of the pressurizing piston, and (ii) a rear-hydraulic-pressure control device capable of controlling a hydraulic pressure in the rearward chamber, and
wherein the stiffness reducer comprises a rearward chamber stiffness reducer configured to reduce stiffness in the rearward chamber to reduce stiffness in the front pressure chamber, and the rearward chamber stiffness reducer is comprised in the rear-hydraulic-pressure control device.

The hydraulic pressure in the front pressure chamber is vibrated with vibrations of a hydraulic pressure in the upstream portion. The vibrations of the hydraulic pressure in the front pressure chamber are transmitted to the rearward chamber via the pressurizing piston. Accordingly, reduction in stiffness of the rearward chamber can reduce stiffness in the front pressure chamber, resulting in reduction in the stiffness in the upstream portion.

It is noted that the front pressure chamber and the upstream portion may be connected to each other in a state in which the front pressure chamber and the upstream portion always communicate with each other and may be connected to each other in a state in which communication and isolation between the front pressure chamber and the upstream portion are switchable.

(3) The hydraulic braking system according to the above form (2), wherein the rearward chamber stiffness reducer comprises a volume-change allowing device configured to allow change in volume of the rearward chamber in a greater degree in the case where the slip control device is in the operating state than in the case where the slip control device is in the non-operating state.

In the case where the change in volume of the rearward chamber (i.e., increase and decrease in volume of the rearward chamber) is allowed, vibrations (i.e., forward and backward movements) of the pressurizing piston in its axial direction can be absorbed. As a result, it is possible to suppress the vibrations of the hydraulic pressure in the front pressure chamber and thereby suppress the vibrations of the hydraulic pressure in the upstream portion.

(4) The hydraulic braking system according to the above form (2) or (3), wherein the rear-hydraulic-pressure control device comprises:
  (i) a regulator comprising (a) a control piston fluid-tightly and slidably fitted in the housing, (b) a control pressure chamber provided at a rear of the control piston, and (c) a servo chamber provided in front of the control piston and connected to the rearward chamber;
  (ii) at least one of a pressure-increase linear valve provided between the control pressure chamber and a high pressure source and a pressure-reduction linear valve provided between the control pressure chamber and a low pressure source;
  (iii) a control-pressure-chamber hydraulic pressure controller configured to control at least one of the pressure-increase linear valve and the pressure-reduction linear valve to control a hydraulic pressure in the control pressure chamber to control a hydraulic pressure in the servo chamber, and wherein the rearward chamber stiffness reducer comprises a control-pressure-chamber stiffness reducer configured to control one or more of at least one of the pressure-increase linear valve and the pressure-reduction linear valve to reduce stiffness in the control pressure chamber such that the stiffness in the control pressure chamber is less in the case where the slip control device is in the operating state than in the case where the slip control device is in the non-operating state, and the control-pressure-chamber stiffness reducer is comprised in the control-pressure-chamber hydraulic pressure controller.

Vibrations of the hydraulic pressure in the rearward chamber are transmitted to the servo chamber and then to the control pressure chamber via the control piston. Accordingly, reduction in the stiffness in the control pressure chamber can suppress vibrations of hydraulic pressures in the servo chamber and the rearward chamber, resulting in suppression of the vibrations of the hydraulic pressures in the front pressure chamber and the upstream portion.

The hydraulic pressure in the rearward chamber and the hydraulic pressure in the servo chamber are made substantially equal to each other, so that a relationship determined by, e.g., a construction of the regulator is established between the hydraulic pressure in the servo chamber and the hydraulic pressure in the control pressure chamber. The hydraulic pressure in the rearward chamber and the hydraulic pressure in the control pressure chamber have a one-to-one relationship. Accordingly, by controlling an actual hydraulic pressure in the control pressure chamber such that the actual hydraulic pressure in the control pressure chamber is brought closer to its target hydraulic pressure, an actual hydraulic pressure in the rearward chamber can be brought closer to its target hydraulic pressure. It is noted that the hydraulic pressure in the servo chamber and the hydraulic pressure in the control pressure chamber may be made substantially equal to each other.

A power hydraulic pressure source may be used as the high pressure source. For example, the power hydraulic pressure source may be constituted by a pump device and an accumulator.

(5) The hydraulic braking system according to the above form (4), wherein the rear-hydraulic-pressure control device comprises a pressure-reduction linear valve provided between the control pressure chamber and a low pressure source, wherein the pressure-reduction linear valve comprises a characteristic in which a valve opening current is less in a case where a pressure differential between the control pressure chamber and the low pressure source is small than in a case where the pressure differential between the control pressure chamber and the low pressure source is large, and wherein the control-pressure-chamber stiffness reducer comprises a pressure-reduction-linear-valve current controller configured to reduce a current to be supplied to a coil of the pressure-reduction linear valve such that the current is less in the case where the slip control device is in the operating state than in the case where the slip control device is in the non-operating state.

In control of the hydraulic pressure in the rearward chamber, even in the case of the same target hydraulic pressure and the same actual hydraulic pressure in the control pressure chamber, the current to be supplied to the coil of the pressure-reduction linear valve is determined so as to be less in the case where the slip control device is in the operating state than in the case where the slip control device is in the non-operating state. Even when the pressure differential is small, an open state of the pressure-reduction linear valve is established, and accordingly the pressure-reduction linear valve tends to be open. As a result, the change in volume of the control pressure chamber is allowed in a greater degree in the case where the slip control device is in the operating state than in the case where the slip control device is in the non-operating state. This allowance of the change can reduce the stiffness.

(6) The hydraulic braking system according to the above form (4) or (5), wherein the rear-hydraulic-pressure control device comprises a pressure-reduction linear valve provided between the control pressure chamber and a low pressure source, wherein the pressure-reduction linear valve is configured to be in an open state when the hydraulic pressure in the control pressure chamber is greater than an opening and closing switching pressure in a state in which the current to be supplied to a coil of the pressure-reduction linear valve is kept, and the opening and closing switching pressure is determined by the current to be supplied to the coil of the pressure-reduction linear valve, and wherein the control-pressure-chamber stiffness reducer comprises a pressure-reduction linear valve controller configured to reduce the opening and closing switching pressure such that the opening and closing switching pressure is less in the case where the slip control device is in the operating state than in the case where the slip control device is in the non-operating state.

In an electromagnetic valve including a poppet valve and a solenoid, a relationship of a position of a valve member relative to a valve seat is determined based on a relationship among a pressure differential force Fp, an elastic force Fs of a spring, and an electromagnetic driving force Fd. The pressure differential force Fp is related to a pressure differential between a high pressure side and a low pressure side of the electromagnetic valve. The electromagnetic driving force Fd is related to a current to be supplied to the coil. In the case where a hydraulic pressure of the low pressure source is constant, the pressure differential force Fp acting on the pressure-reduction linear valve as the electromagnetic valve is greater in the case where the hydraulic pressure in the control pressure chamber is high than in the case where the hydraulic pressure in the control pressure chamber is low. In the case where the pressure-reduction linear valve is a normally open valve, the elastic force Fs of the spring acts on the valve member in a direction in which the valve member is moved away from the valve seat, and when the electromagnetic driving force Fd exceeds the sum of the pressure differential force and the elastic force of the spring, the pressure-reduction linear valve is switched to its closed state (Fd>Fs+Fp: closed). In the case where the pressure-reduction linear valve is a normally closed valve, the elastic force Fs of the spring acts on the valve member in a direction in which the valve member is seated on the valve seat, and when the sum of the electromagnetic driving force Fd and the pressure differential force Fp exceeds the elastic force Fs of the spring, the pressure-reduction linear valve is switched to the open state (Fd+Fp>Fs: open). Even in the case where the pressure-reduction linear valve is any of the normally open valve and the normally closed valve, in a period in which the hydraulic pressure in the control pressure chamber is higher than the opening and closing switching pressure determined by the supply current, the pressure-reduction linear valve is in the open state, so that the control pressure chamber communicates with the low pressure source. In the case where the pressure-reduction linear valve is the normally open valve, the supply current is reduced to reduce the opening and closing switching pressure. In the case where the pressure-reduction linear valve is the normally closed valve, the supply current is increased to reduce the opening and closing switching pressure.

(7) The hydraulic braking system according to the above form (6), wherein the rear-hydraulic-pressure control device comprises a target hydraulic pressure determiner configured to determine a target hydraulic pressure in the control pressure chamber based on a brake request, and wherein the pressure-reduction linear valve controller comprises a target-hydraulic-pressure-change-based pressure-reduction linear valve controller configured to reduce the opening and closing switching pressure such that the opening and closing switching pressure is less in a case where a tendency of the target hydraulic pressure in the control pressure chamber is a decreasing tendency than in a case where the tendency of the target hydraulic pressure in the control pressure chamber is an increasing tendency.

The target hydraulic pressure may be determined, for example, based on the brake request determined based on a state of operation of a brake operating member by a driver. Also, in the case where an automatic brake is activated or in the case where traction control or vehicle stability control is executed, for example, the target hydraulic pressure may be determined based on a brake request which is determined by a request for activation of the automatic brake or a request in each control.

The control pressure chamber is fluidically coupled with the low pressure source more easily in the case where the target hydraulic pressure has the decreasing tendency than in the case where the target hydraulic pressure has the increasing tendency. This can well reduce the hydraulic pressure in the control pressure chamber so as to bring the hydraulic pressure in the control pressure chamber closer to the target hydraulic pressure.

(8) The hydraulic braking system according to the above form (6) or (7), wherein the rear-hydraulic-pressure control device comprises a pressure-increase and pressure-reduction controller configured to compare an actual hydraulic pressure and a target hydraulic pressure in the control pressure chamber with each other to at least execute one of pressure-increase control for increasing the hydraulic pressure in the control pressure chamber and pressure-reduction control for reducing the hydraulic pressure in the control pressure chamber, and wherein the pressure-reduction linear valve controller is configured to reduce the opening and closing switching pressure such that the opening and closing switching pressure is less in a case where the pressure-reduction control is to be executed by the pressure-increase and pressure-reduction controller than in a case where the pressure-increase control is to be executed by the pressure-increase and pressure-reduction controller.

The pressure-increase and pressure-reduction controller may execute any one of the pressure-increase control and the pressure-reduction control and may be execute any one of the pressure-increase control, the pressure-reduction control, and holding control.

It is noted that the actual hydraulic pressure in the control pressure chamber may be directly detected by a sensor or other similar detectors and may be estimated based on, e.g., a control mode of each of the pressure-increase linear valve and the pressure-reduction linear valve.

(9) The hydraulic braking system according to any one of the above forms (4) through (8), wherein the rear-hydraulic-pressure control device comprises (a) a pressure-reduction linear valve provided between the control pressure chamber and a low pressure source and (b) a target-hydraulic-pressure-based pressure-reduction linear valve controller configured to control the pressure-reduction linear valve based on a target hydraulic pressure in the control pressure chamber, and wherein the control-pressure-chamber stiffness reducer comprises a pressure-reduction-linear-valve-control target hydraulic pressure determiner configured to determine the target hydraulic pressure such that the target hydraulic pressure is less in the case where the slip control device is in the operating state than in the case where the slip control device is in the non-operating state.

For example, in the case where the pressure-reduction linear valve is in the open state when the actual hydraulic pressure in the control pressure chamber is greater than the target hydraulic pressure, and the pressure-reduction linear valve is switched to the closed state when the actual hydraulic pressure reaches the target hydraulic pressure, the pressure-reduction linear valve tends to be open when the target hydraulic pressure is set to a small value.

(10) The hydraulic braking system according to any one of the above forms (4) through (9), wherein the rear-hydraulic-pressure control device comprises a pressure-increase linear valve provided between the control pressure chamber and a high pressure source, wherein the pressure-increase linear valve comprises a characteristic in which a valve opening current and a pressure differential between the high pressure source and the control pressure chamber comprise a relationship in which the valve opening current decreases with increase in the pressure differential, and wherein the control-pressure-chamber stiffness reducer comprises a pressure-increase linear valve controller configured to increase a current to be supplied, such that the current is greater in the case where the slip control device is in the operating state than in the case where the slip control device is in the non-operating state.

In control of the hydraulic pressure in the rearward chamber, even in the case of the same target hydraulic pressure and the same actual hydraulic pressure in the control pressure chamber, the current to be supplied to a coil of the pressure-increase linear valve is determined so as to be greater in the case where the slip control device is in the operating state than in the case where the slip control device is in the non-operating state. Even when the pressure differential is small, an open state of the pressure-increase linear valve is established, and accordingly the pressure-increase linear valve tends to be open. As a result, the change in volume of the control pressure chamber is allowed in a greater degree in the case where the slip control device is in the operating state than in the case where the slip control device is in the non-operating state. This allowance of the change can reduce the stiffness in the control pressure chamber.

(11) The hydraulic braking system according to any one of the above forms (4) through (10), wherein the rear-hydraulic-pressure control device comprises a pressure-increase linear valve provided between the control pressure chamber and a high pressure source, wherein the pressure-increase linear valve is in an open state when the hydraulic pressure in the control pressure chamber is less than an opening and closing switching pressure in a state in which a current to be supplied to a coil of the pressure-increase linear valve is kept, and the opening and closing switching pressure is determined by the current to be supplied to the coil of the pressure-increase linear valve, and wherein the control-pressure-chamber stiffness reducer comprises a pressure-increase linear valve controller configured to increase the opening and closing switching pressure such that the opening and closing switching pressure is greater in the case where the slip control device is in the operating state than in the case where the slip control device is in the non-operating state.

In the case where a hydraulic pressure in the high pressure source is constant, a pressure differential force acting on the pressure-increase linear valve is less in the case where the hydraulic pressure in the control pressure chamber is high than in the case where the hydraulic pressure in the control pressure chamber is low. The pressure-increase linear valve is in the closed state when an elastic force of a spring is equal to or greater than the pressure differential force in a state in which no current is supplied to the coil. When the sum of an electromagnetic driving force and the pressure differential force exceeds the elastic force of the spring, the pressure-increase linear valve is switched to the open state to cause the control pressure chamber to communicate with the high pressure source. In the present pressure-increase linear valve, when a greater current is supplied to the coil, the open state of the pressure-increase linear valve is established even when the pressure differential is small (even when the hydraulic pressure in the control pressure chamber is high). Thus, the pressure-increase linear valve tends to be open.

(12) The hydraulic braking system according to the above form (10) or (11), wherein the rear-hydraulic-pressure control device comprises a target: hydraulic pressure determiner configured to determine a target hydraulic pressure in the control pressure chamber based on a brake request, and wherein the pressure-increase linear valve controller comprises a target-hydraulic-pressure-change-based pressure-increase linear valve controller configured to increase a current to be supplied to a coil of the pressure-increase linear valve such that the current to be supplied to the coil of the pressure-increase linear valve is greater in a case where a tendency of the target hydraulic pressure in the control pressure chamber which is determined by the target hydraulic pressure determiner is an increasing tendency than in a case where the tendency of the target hydraulic pressure in the control pressure chamber which is determined by the target hydraulic pressure determiner is a decreasing tendency.

The control pressure chamber is more easily caused to communicate with the high pressure source (the opening and closing switching pressure is higher) in the case where the target hydraulic pressure has the increasing tendency than in the case where the target hydraulic pressure has the decreasing tendency. As a result, the hydraulic pressure in the control pressure chamber can be well increased and brought closer to the target hydraulic pressure.

(13) The hydraulic braking system according to any one of the above forms (10) through (12), wherein the rear-hydraulic-pressure control device comprises a pressure-increase and pressure-reduction controller configured to compare an actual hydraulic pressure and a target hydraulic pressure in the control pressure chamber with each other to at least execute one of pressure-increase control for increasing the hydraulic pressure in the control pressure chamber and pressure-reduction control for reducing the hydraulic pressure in the control pressure chamber, and wherein the pressure-increase linear valve controller is configured to increase the current to be supplied to the coil of the pressure-increase linear valve such that the current to be supplied to the coil of the pressure-increase linear valve is greater in a case where the pressure-increase control is to be executed by the pressure-increase and pressure-reduction controller than in a case where the pressure-reduction control is to be executed by the pressure-increase and pressure-reduction controller.

(14) The hydraulic braking system according to any one of the above forms (4) through (13), wherein the rear-hydraulic-pressure control device comprises (a) a pressure-increase linear valve provided between the control pressure chamber and a high pressure source and (b) a target-hydraulic-pressure-based pressure-increase linear valve controller configured to control the pressure-increase linear valve such that the actual hydraulic pressure in the control pressure chamber is brought closer to a target hydraulic pressure, and wherein the stiffness reducer comprises a pressure-increase-linear-valve-control target hydraulic pressure determiner configured to determine the target hydraulic pressure such that the target hydraulic pressure is greater in the case where the slip control device is in the operating state than in the case where the slip control device is in the non-operating state.

For example, in the case where the pressure-increase linear valve is in the open state when the actual hydraulic pressure in the control pressure chamber is less than the target hydraulic pressure, and the pressure-increase linear valve is switched to the closed state when the actual hydraulic pressure reaches the target hydraulic pressure, the pressure-increase linear valve tends to be open when the target hydraulic pressure is set to a large value.

(15) The hydraulic braking system according to any one of the above forms (4) through (14), wherein the rear-hydraulic-pressure control device comprises (a) a pressure-increase linear valve provided between the control pressure chamber and a high pressure source, (b) a pressure-reduction linear valve provided between the control pressure chamber and a low pressure source, and (c) an opening controller configured to establish open states of both of the pressure-increase linear valve and the pressure-reduction linear valve in at least a portion of a period in which the slip control device is in the operating state.

Both of the pressure-increase linear valve and the pressure-reduction linear valve at least need to be open in at least a portion of the period in which the slip control device is in the operating state and do not necessarily need to be open within the entire period in which the slip control device is in the operating state.

(16) The hydraulic braking system according to any one of the above forms (4) through (15), wherein the rear-hydraulic-pressure control device comprises (a) a pressure-increase linear valve provided between the control pressure chamber and a high pressure source, (b) a pressure-reduction linear valve provided between the control pressure chamber and a low pressure source, and (c) an opening controller configured to establish open states of both of the pressure-increase linear valve and the pressure-reduction linear valve when the hydraulic pressure in the control pressure chamber is within a set range determined by a target hydraulic pressure.

In the case where the hydraulic pressure in the control pressure chamber is substantially equal to the target hydraulic pressure, the pressure-increase linear valve and the pressure-reduction linear valve are closed in most cases. In the hydraulic braking system according to this form, in contrast, when the hydraulic pressure in the control pressure chamber is within the set range determined by the target hydraulic pressure, both of the pressure-increase linear valve and the pressure-reduction linear valve are opened. As a result, the control pressure chamber communicates with the high pressure source and the low pressure source respectively via the pressure-increase linear valve and the pressure-reduction linear valve (via restrictors), allowing working fluid to flow into and from the control pressure chamber. A change in volume of the control pressure chamber (i.e., increase and decrease in volume of the control pressure chamber) is allowed so as to allow vibrations of the hydraulic pressure.

(17) The hydraulic braking system according to any one of the above forms (1) through (16), wherein the slip control device comprises a slip controller configured to use a hydraulic pressure in the hydraulic-pressure producing device to control a hydraulic pressure in each of the plurality of brake cylinders such that a slip of each of the plurality of wheels provided respectively for the plurality of brake cylinders is kept within an appropriate range determined by a coefficient of friction of a road surface.

In the case where the hydraulic-pressure producing device is capable of producing a hydraulic pressure without need for the driver to operate the brake operating member, examples of the slip controller include not only an anti-lock controller but also a traction controller and a vehicle stability controller.

It is noted that the hydraulic pressure in each brake cylinder is in some cases controlled in a state in which the brake cylinder and the hydraulic-pressure producing device communicate with each other.

(18) The hydraulic braking system according to any one of the above forms (1) through (17), wherein the slip control device comprises a plurality of slip-control electromagnetic valves capable of respectively controlling hydraulic pressures in the plurality of brake cylinders by respectively causing the plurality of brake cylinders to communicate with one of the hydraulic-pressure producing device and a low pressure source.

The low pressure source may be a master reservoir or a pressure reduction reservoir, for example. The slip control device may be of a discharge type or a re-circulation type, for example.

The operating state of the slip control device is a state in which at least the slip-control electromagnetic valve is being operated. Opening and closing of the slip-control electromagnetic valve cause vibrations of a hydraulic pressure in an upstream side of the slip-control electromagnetic valve, and these vibrations are suppressed. Examples of the slip-control electromagnetic valve include: a pressure increase valve (a pressure holding valve) provided between the hydraulic-pressure producing device and the brake cylinder; and a pressure reduction valve provided between the brake cylinder and the low pressure source.

(19) The hydraulic braking system according to any one of the above forms (1) through (18), wherein the slip control device comprises a pump device configured to pump up working fluid having flowed from the plurality of brake cylinders, to supply the working fluid to the upstream portion.

The operating state of the slip control device is at least one of a state in which the slip-control electromagnetic valve is being operated and a state in which the pump device is being operated. Operations of the pump device cause vibrations of a hydraulic pressure in an upstream side of the slip-control electromagnetic valve, and these vibrations are suppressed. A damper is in most cases provided to suppress the vibrations caused by the operations of the pump device. In the hydraulic braking system according to this form, however, the hydraulic-pressure producing device is controlled to suppress the vibrations of the hydraulic pressure in the upstream portion. This eliminates a need for providing a damper, avoiding increase in size of the hydraulic braking system, resulting in reduced increase in cost.

For example, the slip control device may be configured to include: a slip-control electromagnetic valve; a pressure reduction reservoir storing working fluid having flowed from the plurality of brake cylinders; and a pump device configured to pump up the working fluid out of the pressure reduction reservoir to supply the working fluid to the upstream portion.

(20) The hydraulic braking system according to the above form (18) or (19), wherein each of at least one first slip-control electromagnetic valve as one or more of the plurality of slip-control electromagnetic valves is provided between the hydraulic-pressure producing device and a corresponding one of the plurality of brake cylinders, and wherein the slip control device comprises a pressure differential controller configured to control the at least one first slip-control electromagnetic valve such that a difference between an output hydraulic pressure of the hydraulic-pressure producing device and a hydraulic pressure in each of one or more of the plurality of brake cylinders to which the at least one first slip-control electromagnetic valve is connected is brought closer to a corresponding target pressure differential.

In the hydraulic braking system according to this form, the respective hydraulic pressures in the plurality of brake cylinders are controllable by a plurality of slip-control electromagnetic valves, individually.

(21) The hydraulic braking system according to any one of the above forms (2), (3), and (17) through (20), wherein the rear-hydraulic-pressure control device comprises (a) at least one of a rearward chamber pressure-increase linear valve provided between the rearward chamber and a high pressure source and a rearward chamber pressure-reduction linear valve provided between the rearward chamber and a low pressure source and (b) a rearward chamber-hydraulic-pressure direct controller configured to control the at least one of the rearward chamber pressure-increase linear valve and the rearward chamber pressure-reduction linear valve to control the hydraulic pressure in the rearward chamber to control a hydraulic pressure in the front pressure chamber, and wherein the rearward chamber stiffness reducer comprises a direct rearward chamber stiffness reducer configured to control one or more of the at least one of the rearward chamber pressure-increase linear valve and the rearward chamber pressure-reduction linear valve to reduce the stiffness in the rearward chamber such that the stiffness in the rearward chamber is less in the case where the slip control device is in the operating state than in the case where the slip control device is in the non-operating state, and the direct rearward chamber stiffness reducer is comprised in the rearward chamber-hydraulic-pressure direct controller.

The pressure-increase linear valve and the pressure-reduction linear valve are directly connected to the rearward chamber, and the hydraulic pressure in the rearward chamber is controlled to control the hydraulic pressure in the front pressure chamber.

The technical feature according to any one of the above forms (5) through (16) can be employed for control of the rearward chamber pressure-increase linear valve and the rearward chamber pressure-reduction linear valve.

(22) The hydraulic braking system according to any one of the above forms (1) and (17) through (20), wherein the hydraulic-pressure producing device comprises a power hydraulic pressure source and an upstream-portion hydraulic pressure controller configured to use a hydraulic pressure in the power hydraulic pressure source to control a hydraulic pressure in the upstream portion.

The hydraulic-pressure producing device may or may not include a manual hydraulic pressure source such as a master cylinder as described above. In the case where the hydraulic-pressure producing device does not include the manual hydraulic pressure source, the hydraulic pressure in the power hydraulic pressure source is used to control the hydraulic pressure in the upstream portion in a state in which the upstream portion is isolated from the manual hydraulic pressure source. Also, the upstream-portion hydraulic pressure controller suppresses the vibrations of the hydraulic pressure in the upstream portion.

It is noted that the upstream-portion hydraulic pressure controller may be configured to include one or more electromagnetic valves and control the one or more electromagnetic valves to control the hydraulic pressure in the upstream portion and may be configured to control a pump motor of a pump device of the power hydraulic pressure source to control the hydraulic pressure in the upstream portion.

(23) The hydraulic braking system according to any one of the above forms (1), (17) through (20), and (22), wherein the hydraulic-pressure producing device comprises; (i) a high pressure source and (ii) at least one of an upstream pressure-increase linear valve provided between a high pressure source and the upstream portion and an upstream pressure-reduction linear valve provided between the upstream portion and a low pressure source, and wherein the stiffness reducer is configured to control one or more of the at least one of the upstream pressure-increase linear valve and the upstream pressure-reduction linear valve to reduce the stiffness in the upstream portion such that the stiffness in the upstream portion is less in the case where the slip control device is in the operating state than in the case where the slip control device is in the non-operating state.

The technical feature according to any one of the above forms (5) through (16) can be employed for control of the upstream pressure-increase linear valve and the upstream pressure-reduction linear valve.

(24) A hydraulic braking system, comprising;

a plurality of brake cylinders;

a hydraulic-pressure producing device comprising (a) a pressurizing piston fluid-tightly and slidably fitted in a housing, (b) an advancing-force control device configured to apply an advance force from a position behind the pressurizing piston, the advance force being a force in an advance direction, and (c) a front pressure chamber provided in front of the pressurizing piston, the plurality of brake cylinders being connected to the front pressure chamber, the hydraulic-pressure producing device being capable of controlling a hydraulic pressure in the front pressure chamber using the advancing-force control device; and a slip control device capable of individually controlling respective hydraulic pressures in the plurality of brake cylinders by causing each of the plurality of brake cylinders to communicate with any one of the front pressure chamber and a low pressure source, wherein the advancing-force control device comprises a vibration suppressor configured to suppress a vibration of the hydraulic pressure in the front pressure chamber in a case where the slip control device is in an operating state.

The advancing-force control device may be configured to include (i) an electric motor and (ii) a motion converter. The motion converter is also a motion transmission mechanism configured to convert a rotational power of an output shaft of the electric motor to an advance force to transmit the advance force to the pressurizing piston. The technical feature according to any one of the above forms (1) through (23) can be employed for the hydraulic braking system according to this form. In particular, the technical feature for the stiffness reducer can be employed for the vibration suppressor. This applies to the forms (25) through (27).

(25) A hydraulic braking system, comprising;

a plurality of brake cylinders;

a hydraulic-pressure producing device comprising (i) a master cylinder comprising (a) a pressurizing piston fluid-tightly and slidably fitted in a housing, (b) a front pressure chamber provided in front of the pressurizing piston, the plurality of brake cylinders being connected to the front pressure chamber, and (c) a rearward chamber provided at a rear of the pressurizing piston, and (ii) a rear-hydraulicpressure control device capable of controlling a hydraulic pressure in the rearward chamber; and a slip control device capable of individually controlling respective hydraulic pressures in the plurality of brake cylinders by causing each of the plurality of brake cylinders to communicate with any one of the front pressure chamber and a low pressure source, wherein the rear-hydraulic-pressure control device comprises a vibration suppressor configured to suppress a vibration of the hydraulic pressure in the front pressure chamber in a case where the slip control device is in an operating state.

The technical feature according to any one of the above forms (1) through (23) can be employed for the hydraulic braking system according to this form.

(26) A hydraulic braking system, comprising;
a hydraulic-pressure producing device;
a plurality of brake cylinders; and
a slip control device provided between the hydraulic-pressure producing device and the plurality of brake cylinders and comprising a pump device configured to transfer working fluid having flowed from the plurality of brake cylinders, back to an upstream portion located upstream of the plurality of brake cylinders, wherein the hydraulic-pressure producing device comprises a vibration suppressor configured to execute electronic control to suppress a vibration of a hydraulic pressure in the upstream portion.

The technical feature according to any one of the above forms (1) through (23) can be employed for the hydraulic braking system according to this form.

(27) A hydraulic braking system, comprising:
a plurality of brake cylinders;
a hydraulic-pressure producing device; and
a slip control device provided between the hydraulic-pressure producing device and the plurality of brake cylinders and configured to control a hydraulic pressure in each of at least one of the plurality of brake cylinders, the slip control device comprising a pump device configured to transfer working fluid having flowed from the plurality of brake cylinders, back to an upstream portion located upstream of the plurality of brake cylinders, wherein the hydraulic-pressure producing device comprises a stiffness reducer configured to reduce a stiffness in the upstream portion such that the stiffness in the upstream portion is less in a case where the pump device is in an operating state than in a case where the pump device is in a non-operating state.

The technical feature according to any one of the above forms (1) through (23) can be employed for the hydraulic braking system according to this form.

BRIEF DESCRIPTION OF THE DRAWINGS

FIG. 2(a) is a cross-sectional view illustrating a pressure-increase linear valve of the hydraulic braking system, and FIG. 2(b) is a view illustrating a characteristic of the pressure-increase linear valve.

FIG. 3(a) is a cross-sectional view illustrating a pressure-reduction linear valve of the hydraulic braking system, and FIG. 3(b) is a view illustrating a characteristic of the pressure-reduction linear valve.

FIG. 6(a) is a view conceptually illustrating an amount of opening of each of the pressure-increase linear valve and the pressure-reduction linear valve in anti-lock control. FIG. 6(b) is a view conceptually illustrating an amount of opening of each of the pressure-increase linear valve and the pressure-reduction linear valve in normal braking.

EMBODIMENTS OF THE INVENTION

Hereinafter, there will be described a hydraulic braking system according to one embodiment of the present invention by reference to drawings.

It is noted that the present hydraulic braking system may be installed in hybrid vehicles, electric vehicles, fuel-cell vehicles, and internal combustion vehicles. In the case where the present hydraulic braking system is installed in a vehicle such as the hybrid vehicles, the electric vehicles, and the fuel-cell vehicles, a regenerative braking force is applied to drive wheels, and regenerative cooperative control is executed. However, the regenerative cooperative control is not executed in the internal combustion vehicle. In the present hydraulic braking system, in any case, a braking force of a hydraulic brake is electrically controlled to have a desired magnitude.

First Embodiment

<Configuration of Hydraulic Braking System>

Figure 1:
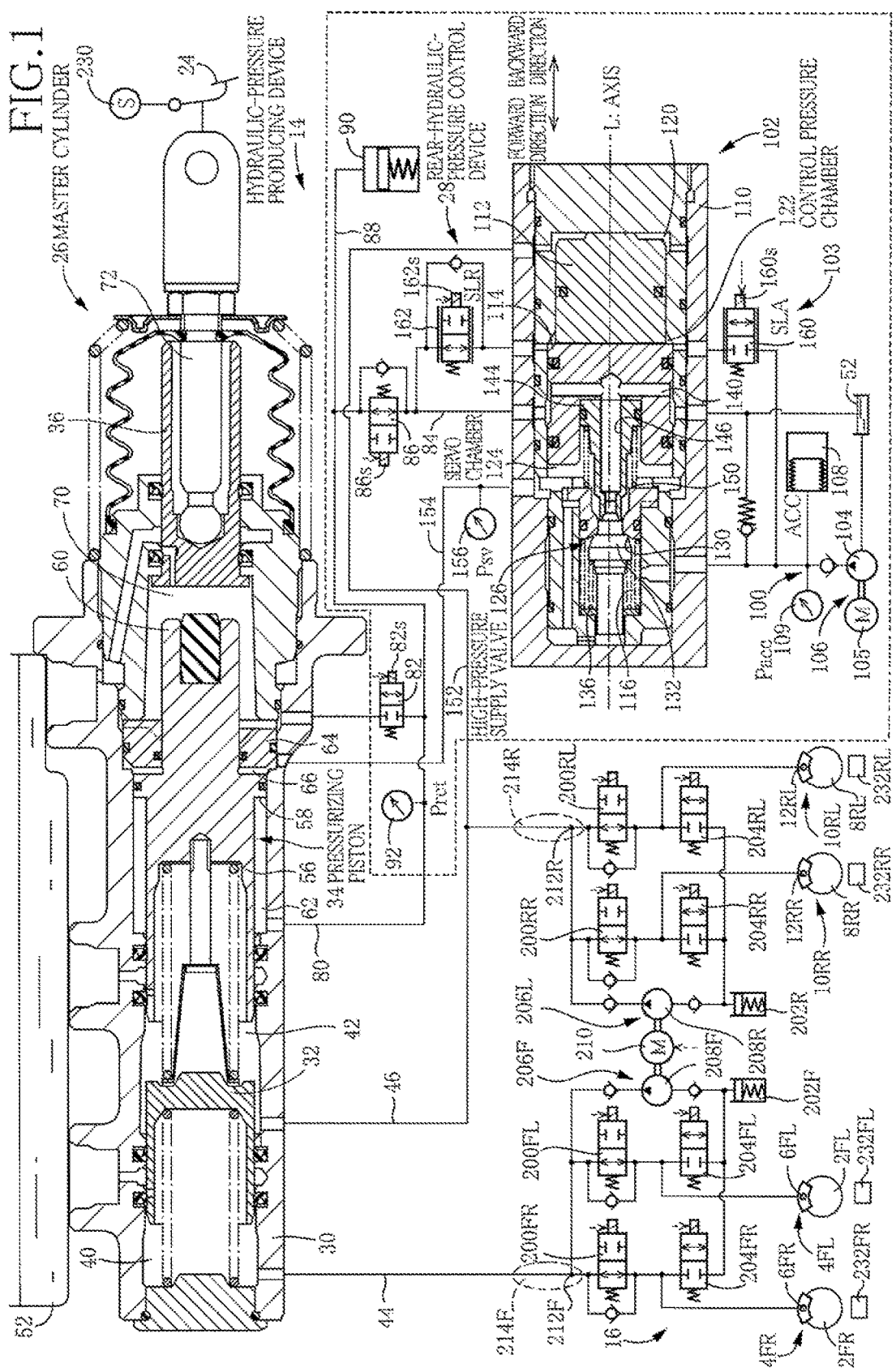
FIG. 1 is a circuit diagram illustrating a hydraulic braking system according to a first embodiment of the present invention.

As illustrated in FIG. 1, the hydraulic brake system includes (i) brake cylinders 6FL, 6FR of hydraulic brakes 4FL, 4FR respectively provided for front left and right wheels 2FL, 2FR, and brake cylinders 12RL, 12RR of hydraulic brakes 10RL, 10RR respectively provided for rear left and right wheels 8RL, 8RR, (ii) a hydraulic-pressure producing device 14 capable of supplying a hydraulic pressure to these brake cylinders 6FL, 6FR, 12RL, 12RR, and (iii) a slip control device 16 provided between the hydraulic-pressure producing device 14 and the brake cylinders 6FL, 6FR, 12RL, 12RR. Devices such as the hydraulic-pressure producing device 14 and the slip control device 16 are controlled by a brake ECU 20 (see FIG. 4) constituted mainly by a computer.

[Hydraulic-Pressure Producing Device]

The hydraulic-pressure producing device 14 includes (i) a brake pedal 24 as a brake operating member, (ii) a master cylinder 26, (iii) a rear-hydraulic-pressure control device 28 configured to control a hydraulic pressure in a rearward chamber of the master cylinder 26.

{Master Cylinder}

The master cylinder 26 includes (a) a housing 30 and (b) pressurizing pistons 32, 34 and an input piston 36 arranged in series and fluid-tightly and slidably fitted in a cylinder bore formed in the housing 30.

Front pressure chambers 40, 42 are defined in front of the respective pressurizing pistons 32, 34. The brake cylinders 6FL, 6FR of the hydraulic brakes 4FL, 4FR provided for the respective front left and right wheels 2FL, 2FR are connected to the front pressure chamber 40 by a fluid passage 44, while the brake cylinders 12RL, 12RR of the hydraulic brakes 10RL, 10RR provided for the respective rear left and right wheels 8RL, 8RR are connected to the front pressure chamber 42 by a fluid passage 46. The hydraulic pressure supplied to each of the brake cylinders 6FL, 6FR, 12RL, 12RR actuates a corresponding one of the hydraulic brakes 4FL, 4FR, 10RL, 10RR to restrain rotation of a corresponding one of the wheels 2FL, 2FR, 8RL, 8RR.

In the following description, where the distinction of wheels is not required, each of devices such as the hydraulic brakes and electromagnetic valves which will be described below may be referred without suffixes (FL, FR, RL, RR) indicative of the corresponding wheels.

Return springs are respectively provided between the pressurizing piston 32 and the housing 30 and between the two pressurizing pistons 32, 34 to urge the pressurizing pistons 32, 34 backward or in a retracting direction. When the pressurizing pistons 32, 34 are located at their respective back end positions, the front pressure chambers 40, 42 are in communication with a master reservoir (which may be referred to as "reservoir tank") 52.

The pressurizing piston 34 includes (a) a front piston portion 56 provided in a front portion thereof, (b) an intermediate piston portion 58 provided in an intermediate portion of the pressurizing piston 34 so as to protrude in its radial direction, and (c) a rear small-diameter portion 60 provided in a rear portion of the pressurizing piston 34 and having a diameter smaller than that of the intermediate piston portion 58. The front piston portion 56 and the intermediate piston portion 58 are fluid-tightly and slidably fitted in the housing 30. A space in front of the front piston portion 56 is the front pressure chamber 42, and a space in front of the intermediate piston portion 58 is an annular chamber 62.

The housing 30 is provided with an annular inner-circumferential-side protruding portion 64, and the rear portion of the intermediate piston portion 58, i.e., the rear small-diameter portion 60 is fluid-tightly and slidably fitted in the inner-circumferential-side protruding portion 64. As a result, a rearward chamber 66 is formed at a rear of the intermediate piston portion 58 and between the intermediate piston portion 58 and the inner-circumferential-side protruding portion 64.

The input piston 36 is located at a rear of the pressurizing piston 34, and an input chamber 70 is defined between the rear small-diameter portion 60 and the input piston 36. The brake pedal 24 is engaged with a rear portion of the input piston 36 by an operating rod 72 and other components.

It is also possible to consider that the front piston portion 56 and the intermediate piston portion 58 of the pressurizing piston 34 constitute a pressurizing piston (or a pressurizing piston portion).

The annular chamber 62 and the input chamber 70 are connected to each other by a connecting passage 80. A communication control valve 82 is provided in the connecting passage 80. The communication control valve 82 is an electromagnetic open/close valve which is opened and closed according to a state of current supplied to a coil 82$s$, specifically, the communication valve 82 is a normally closed valve which establishes its closed state when no current is supplied to the coil 82$s$. A portion of the connecting passage 80 which is located on one of opposite sides of the communication control valve 82 which is nearer to the annular chamber 62 is connected to the master reservoir 52 by a reservoir passage 84 in which a reservoir cut-off valve 86 is provided. The reservoir cut-off valve 86 is an electromagnetic open/close valve which is opened and closed according to a state of current supplied to a coil 86$s$, specifically, the reservoir cut-off valve 86 is a normally open valve which establishes its open state when no current is supplied to the coil 86$s$.

A stroke simulator 90 is connected, by a simulator passage 88, to the portion of the connecting passage 80 which is located on one of opposite sides of the communication control valve 82 which is nearer to the annular chamber 62. Since the stroke simulator 90 is connected to the input chamber 70 by the simulator passage 88 and the connecting passage 80, operations of the stroke simulator 90 are allowed when the communication control valve 82 is in its open state and are inhibited when the communication control valve 82 is in its closed state.

A hydraulic sensor 92 is provided in a portion of the connecting passage 80 which is located on one of opposite sides of the portion thereof to which the reservoir passage 84 is connected, and the one of opposite sides is nearer to the annular chamber 62. The hydraulic sensor 92 detects hydraulic pressures in the annular chamber 62 and the input chamber 70 in a state in which the annular chamber 62 and the input chamber 70 are in communication with each other and isolated from the master reservoir 52. The hydraulic pressures detected by the hydraulic sensor 92 have a magnitude related to an operating force of the brake pedal 24. Accordingly, the hydraulic sensor 92 can be referred to as "operating-force sensor" and "operation-related hydraulic sensor".

{Rear-Hydraulic-Pressure Control Device}

The rear-hydraulic-pressure control device 28 is connected to the rearward chamber 66.

The rear-hydraulic-pressure control device 28 includes (a) a high pressure source 100, (b) a regulator 102, and (c) a linear valve device 103.

The high pressure source 100 includes: a pump device 106 including a pump 104 and a pump motor 105; and an accumulator 108 configured to accumulate working fluid discharged from the pump device 106 in a pressurized state. A hydraulic pressure of the working fluid accumulated in the accumulator 108 is called an accumulator pressure which is detected by an accumulator pressure sensor 109. The pump motor 105 is controlled so as to keep the accumulator pressure within a predetermined range.

The regulator 102 includes (d) a housing 110, and (e) a pilot piston 112 and a control piston 114 provided in the housing 110 so as to be arranged in series in a direction parallel to an axis L. The housing 110 has a stepped cylinder bore which includes: a large diameter portion in which the pilot piston 112 and the control piston 114 are fluid-tightly and slidably fitted; and a small diameter portion having a high pressure chamber 116 connected to the high pressure source 100. A space between the pilot piston 112 and the housing 110 is a pilot pressure chamber 120, a space at a rear of the control piston 114 is a control pressure chamber 122, and a space between the control piston 114 and a step between the large diameter portion and the small diameter portion of the cylinder bore is a servo chamber 124. Also, a high-pressure supply valve 126 is provided between the servo chamber 124 and the high pressure chamber 116.

The high-pressure supply valve 126 is a normally closed valve and includes (f) a valve seat 130, (g) a valve member 132 which can be seated on and moved off the valve seat 130, and (h) a spring 136 for applying an elastic force to the valve member 132 in a direction in which the valve seat 130 is to be seated (i.e., a retracting direction).

A central portion of a main body of the control piston 114 has: a mating hole extending parallel to the axis L; and a fluid passage 140 having a portion extending in a direction perpendicular to the axis L (i.e., a radial direction) and communicating with the mating hole. The fluid passage 140 is always in communication with a low pressure port connected to the master reservoir 52.

A valve opening member 144 extending parallel to the axis L is fitted in the mating hole. The valve opening member 144 has: a central portion in which is formed an axial direction passage 146 extending parallel to the axis L; a rear end portion which opens to the fluid passage 140; and a front end portion which is opposed to the valve member 132. The low pressure port and the front end portion of the valve opening member 144 which is opposed to the valve member 132 are connected to each other by the axial direction passage 146 and the fluid passage 140.

A spring 150 is provided between the valve opening member 144 and the housing 110 to urge the control piston 114 (having the valve opening member 144) in its retracting direction.

It is noted that the pilot pressure chamber 120 is connected to the fluid passage 46 by a pilot passage 152. Thus, a hydraulic pressure in the pressure chamber 42 of the master cylinder 26 acts on the pilot piston 112.

The rearward chamber 66 of the master cylinder 26 is connected to the servo chamber 124 by a servo passage 154. Since the servo chamber 124 and the rearward chamber 66 are directly connected to each other, a hydraulic pressure in the servo chamber 124 and a hydraulic pressure in the rearward chamber 66 are principally equal to each other. It is noted that a servo-hydraulic-pressure sensor (which may be referred to as "rearward chamber hydraulic sensor") 156 is provided in the servo passage 154 to detect the hydraulic pressure in the servo chamber 124 (i.e., the hydraulic pressure in the rearward chamber 66).

The linear valve device 103 including a pressure-increase linear valve 160 and a pressure-reduction linear valve 162 is connected to the control pressure chamber 122. A hydraulic pressure in the control pressure chamber 122 is controlled by control of currents supplied to a coil 160s of the pressure-increase linear valve 160 and a coil 162s of the pressure-reduction linear valve 162.

As illustrated in FIG. 2(a), the pressure-increase linear valve 160 includes a poppet valve 170 and a solenoid 172. The poppet valve 170 includes a valve seat 174, a valve member 176, and a spring 178 configured to apply an elastic force Fs to the valve member 176 in a direction in which the valve member 176 is moved toward the valve seat 174. The solenoid 172 includes the coil 160s and a plunger 182. When a current is supplied to the coil 160s, an electromagnetic driving force Fd is generated. The plunger 182 applies this electromagnetic driving force Fd to the valve member 176. The pressure-increase linear valve 160 is provided in such a position that a pressure differential force Fp, which is related to a hydraulic pressure difference between the high pressure source 100 and the control pressure chamber 122, acts on the valve member 176 in a direction in which the valve member 176 is moved away from the valve seat 174.

$$Fp+Fd:Fs$$

When the sum of the pressure differential force Fp and the electromagnetic driving force Fd exceeds the elastic force Fs of the spring 178, a state of the pressure-increase linear valve 160 is switched from its closed state to its open state. The pressure-increase linear valve 160 has a characteristic indicating a relationship illustrated in FIG. 2(b) between a valve opening current IopenA and the pressure differential.

FIG. 2(b) indicates that the poppet valve 170 is opened more easily in the case where an amount of the current supplied to the coil 160s is large than in the case where an amount of the current supplied to the coil 160s is small, even when the pressure differential force Fp is small. That is, the poppet valve 170 is open when the hydraulic pressure in the control pressure chamber 122 is lower than the hydraulic pressure in the control pressure chamber 122 which corresponds to the pressure differential determined by the supply current and the characteristic illustrated in FIG. 2(b). It is noted that the hydraulic pressure in the control pressure chamber 122 may be referred to as "opening and closing switching pressure". The opening and closing switching pressure is larger in the case where the amount of the supply current is large than in the case where the amount of the supply current is small.

As illustrated in FIG. 3(a), the pressure-reduction linear valve 162 includes a poppet valve 186 and a solenoid 188. The poppet valve 186 includes a valve seat 190, a valve member 191, and a spring 192 configured to apply an elastic force Fs in a direction in which the valve member 191 is moved away from the valve seat 190. The solenoid 188 includes the coil 162s and a plunger 195. When a current is supplied to the coil 162s, an electromagnetic driving force Fd acts on the valve member 191 in a direction in which the valve member 191 is seated on the valve seat 190. A pressure differential force Fp, which is related to a pressure differential between the control pressure chamber 122 and the master reservoir, acts on the valve member 191 in a direction in which the valve member 191 is moved away from the valve seat 190.

$$Fs+Fp:Fd$$

When the electromagnetic driving force Fd exceeds the sum of the pressure differential force Fp and the elastic force Fs of the spring, a state of the pressure-reduction linear valve 162 is switched from its open state to its closed state. The pressure-reduction linear valve 162 has a characteristic indicating a relationship illustrated in FIG. 3(b) between a valve opening current IopenR and the pressure differential.

As illustrated in FIG. 3(b), the poppet valve 186 is opened more easily in the case where an amount of the current supplied to the coil 162s is large than in the case where an amount of the current supplied to the coil 162s is small, even when the pressure differential (i.e., the hydraulic pressure in the control pressure chamber 122) is large. That is, the poppet valve 186 is open when the hydraulic pressure in the control pressure chamber 122 is higher than the pressure differential determined by the amount of current supplied to the coil 162s and the characteristic illustrated in FIG. 3(b). It is noted that this pressure differential is equal to the hydraulic pressure in the control pressure chamber 122 and may be referred to as "opening and closing switching pressure". The opening and closing switching pressure is lower in the case where the amount of the supply current is small than in the case where the amount of the supply current is large.

[Slip Control Device]

The slip control device 16 includes: pressure holding valves 200FR, FL provided respectively between the pressure chamber 40 and the brake cylinder 6FR and between the pressure chamber 40 and the brake cylinder 6FL; pressure reduction valves 204FR, FL provided respectively between the brake cylinder 6FR and a pressure reduction reservoir 202F and between the brake cylinder 6FL and the pressure reduction reservoir 202F; a pump device 206F configured to pump up working fluid out of the pressure reduction reservoir 202F to transfer the working fluid to areas located upstream of the respective pressure holding valves 200FR, FL; pressure holding valves 200RR, RL provided respectively between the pressure chamber 42 and the brake cylinder 12RR and between the pressure chamber 42 and the brake cylinder 12RL; pressure reduction valves 204RR, RL provided respectively between the brake cylinder 12RR and a pressure reduction reservoir 202R and between the brake cylinder 12RL and the pressure reduction reservoir 202R; and a pump device 206R configured to pump up working fluid out of the pressure reduction reservoir 202R to transfer the working fluid to areas located upstream of the respective pressure holding valves 200RR, RL. A single pump motor 210 is provided for both of the pump devices 206F, R. Each of the pump devices 206F, R includes a corresponding one of pumps 208F, R in addition to the pump motor 210.

Each of the pressure holding valve 200 and the pressure reduction valve 204 is an electromagnetic valve which is opened and closed by control of a current supplied to a corresponding one of coils 200s, 204s. The pressure holding valve 200 is a normally open valve, and the pressure reduction valve 204 is a normally closed valve. Duty control is executed for the currents supplied to the coils 200s, 204s of the pressure holding valve 200 and the pressure reduction valve 204, resulting in generation of a pressure differential having a magnitude determined by a duty ratio.

For each pressure holding valve 200, the duty ratio is determined such that an actual pressure differential which is obtained by subtracting a hydraulic pressure in a corresponding one of the brake cylinders 6, 12 from a hydraulic pressure in a corresponding one of the front pressure chambers 40, 42 is brought closer to a target pressure differential which is a difference between an estimated hydraulic pressure in the corresponding one of the front pressure chambers 40, 42 and a target hydraulic pressure in the corresponding one of the brake cylinders 6, 12. The pressure differential is larger, and the hydraulic pressure in the corresponding one of the brake cylinders 6, 12 is lower with respect to the hydraulic pressure in the corresponding one of the front pressure chambers 40, 42 in the case where the duty ratio is large than in the case where the duty ratio is small. For each pressure reduction valve 204, duty control is executed based on a duty ratio determined such that an actual hydraulic pressure in the corresponding one of the brake cylinders 6, 12 which is obtained by subtracting a hydraulic pressure in a corresponding one of the pressure reduction reservoirs 202F, R (which can be estimated to an atmospheric pressure) from the hydraulic pressure in the corresponding one of the brake cylinders 6, 12 is brought closer to the target hydraulic pressure. The hydraulic pressures in the respective brake cylinders 6, 12 are smaller in the case where the duty ratio is large than in the case where the duty ratio is small.

During control of opening and/or closing the pressure holding valve 200 and the pressure reduction valve 204, in principle, the pump devices 206F, R are operated to pump up the working fluid out of the respective pressure reduction reservoirs 202F, R and transfer the working fluid to respective supply portions 212F, R located upstream of the pressure holding valve 200. In view of the above, the present slip control device is of a re-circulation type.

It is noted that the supply portions 212F, R are portions of the respective fluid passages 44, 46 and are in communication with the respective front pressure chambers 40, 42. Also, the fluid passages 44, 46 respectively include upstream portions 214F, R which include the respective connecting portions 212F, R and portions of the respective fluid passages 44, 46 which are located upstream of the pressure holding valve 200.

[Brake ECU]

Figure 4:
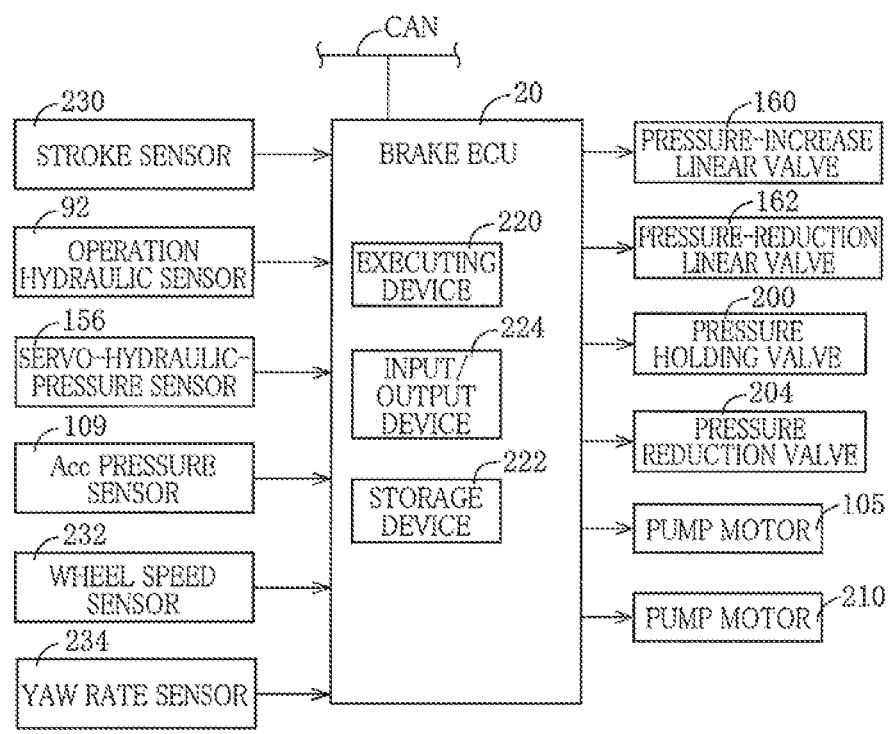
FIG. 4 is a view illustrating a brake ECU of the hydraulic braking system and devices connected to the brake ECU.

As illustrated in FIG. 4, the brake ECU 20 is mainly constituted by a computer including an executing device 220, a storage device 222, and an input/output device 224. Devices connected to the input/output device 224 include: the above-described operating hydraulic sensor 92; the accumulator pressure sensor 109; the servo-hydraulic-pressure sensor 156; a stroke sensor 230 configured to detect a stroke of the brake pedal 24 (hereinafter may be referred to as "operating stroke"); a wheel speed sensor 232 configured to detect a speed of each of the front left and right and rear left and right wheels 2FL, FR, 8RL, RR; a yaw rate sensor 234 configured to detect a yaw rate of the vehicle; the pump motors 105, 210 which are connected to the input/output device 224 via a drive circuit, not shown; and the coils of the electromagnetic valves such as the pressure-increase linear valve 160, the pressure-reduction linear valve 162, the pressure holding valve 200, and the pressure reduction valve 204.

The storage device 222 of the brake ECU 20 stores a plurality of programs and tables, for example.

<Operations in Hydraulic Braking System>

[Normal Braking Control]

The regenerative cooperative control is principally executed in the case where the present hydraulic braking system is installed in a vehicle such as the electric vehicles and the hybrid vehicles.

For example, a brake request is issued when the brake pedal 24 is depressed by a driver, for example. When a regenerative braking force is enough for a braking force required based on the brake request, the hydraulic brakes 4, 10 are not actuated.

In the master cylinder 26, the communication control valve 82 is opened, and the reservoir cut-off valve 86 is closed, so that the input chamber 70 and the annular chamber 62 communicate with each other, are isolated from the master reservoir, and communicate with the stroke simulator 90. The area of a pressure receiving surface of the intermediate piston portion 58 which faces the annular chamber 62 is equal to that of the rear small-diameter portion 60 which faces the input chamber 70. Thus, in the pressurizing piston 34, an advancing force generated due to the hydraulic pressure in the input chamber 70 is balanced with a retracting force generated due to the hydraulic pressure in the annular chamber 62. Forward movement of the brake pedal 24 advances the input piston 36 relative to the pressurizing piston 34, thereby actuating the stroke simulator 90.

Also, the linear valve device 103 is not controlled, so that the regulator 102 is in its non-operating state. Thus, no hydraulic pressure is supplied to the rearward chamber 66 of the master cylinder 26. In this state, the pressurizing piston 34 is not advanced, so that no hydraulic pressure is generated in the front pressure chambers 40, 42, and each of the hydraulic brakes 4, 10 is in its non-operating state.

When the regenerative braking force is not enough for the braking force requested by the driver, on the other hand, the hydraulic brakes 4, 10 are actuated.

In the regulator 102, the linear valve device 103 is controlled to increase the hydraulic pressure in the control pressure chamber 122. Thus, the control piston 114 is advanced, resulting in increase in the hydraulic pressure in the servo chamber 124. The high-pressure supply valve 126 is switched to its open state and fluidically coupled with the high pressure chamber 116, so that the hydraulic pressure in the servo chamber 124 is supplied to the rearward chamber 66. In the master cylinder 26, the hydraulic pressure in the rearward chamber 66 moves the pressurizing piston 34 forward, so that hydraulic pressures are generated in the front pressure chambers 40, 42 and supplied to the respective brake cylinders 6, 12 to actuate the respective hydraulic brakes 4, 10.

Thus, the hydraulic pressure in each of the brake cylinders 6, 12 is controlled by the control of the linear valve device 103 such that the hydraulic braking force and the regenerative braking force are sufficient for the braking force requested by the driver (which may be referred to as "requested braking force" or "requested total braking force").

It is noted that the slip control device 16 is not controlled. Each of the pressure holding valve 200 and the pressure reduction valve 204 is located at its illustrated original position, and the pump motor 210 is in a rest state.

In the case where the present hydraulic braking system is mounted on the internal combustion vehicle or in the case where the regenerative cooperative control is not executed, the linear valve device 103 is controlled such that the hydraulic brakes 4, 10 generate a force enough for the braking force requested by the driver.

{Control of Linear Valve Device}

The requested braking force (i.e., the requested total braking force) is determined based on an operation state of the brake pedal 24 (which can be represented by at least one of the operating stroke detected by the stroke sensor 230 and the operating force detected by the operating hydraulic sensor 92). In the case where the regenerative cooperative control is to be executed, a target hydraulic braking force is determined based on a value obtained by subtracting the regenerative braking force from the requested braking force. In the case where the regenerative cooperative control is not to be executed, the target hydraulic braking force is determined based on the requested braking force.

Also, target hydraulic pressures in the respective front pressure chambers 40, 42 are determined based on the target hydraulic braking force, and a target hydraulic pressure Pref in the rearward chamber 66 is determined based on these target hydraulic pressures, and a target hydraulic pressure in the control pressure chamber 122 is determined. The amounts of currents supplied to the pressure-increase linear valve 160 and the pressure-reduction linear valve 162 are controlled such that an actual hydraulic pressure in the control pressure chamber 122 is brought closer to the target hydraulic pressure.

The hydraulic pressures in the respective front pressure chambers 40, 42 and the hydraulic pressure in the rearward chamber 66 have a relationship which is determined by, e.g., construction of the master cylinder 26. A hydraulic pressure in the control pressure chamber 122 and the hydraulic pressure in the servo chamber 124 which is equal in magnitude to the hydraulic pressure in the rearward chamber 66 have a relationship which is determined by, e.g., construction of the regulator 102. In the present embodiment, the hydraulic pressure in the servo chamber 124 and the hydraulic pressure in the control pressure chamber 122 are made equal to each other. Accordingly, it is possible to consider that the linear valve device 103 is controlled such that an actual hydraulic pressure in the rearward chamber 66 (which is detected by the servo-hydraulic-pressure sensor 156 and may be hereinafter referred to as "actual rearward chamber hydraulic pressure P*") is brought closer to a target hydraulic pressure in the rearward chamber 66 which is determined based on the target hydraulic pressures in the respective front pressure chambers 40, 42. This target hydraulic pressure in the rearward chamber 66 is equal in magnitude to a target hydraulic pressure in the servo chamber 124 and may be hereinafter referred to as "target rearward chamber hydraulic pressure Pref.".

Specifically, a control mode is determined based on at least one of a tendency of change in the target rearward chamber hydraulic pressure Pref and a difference between the target rearward chamber hydraulic pressure Pref and the actual rearward chamber hydraulic pressure P*. For example, a pressure increase mode is set in at least one of the case where the target rearward chamber hydraulic pressure Pref has an increasing tendency and the case where the actual rearward chamber hydraulic pressure P* is low with respect to the target rearward chamber hydraulic pressure Pref. A pressure reduction mode is set in at least one of the case where the target rearward chamber hydraulic pressure Pref has a decreasing tendency and the case where the actual rearward chamber hydraulic pressure P* is high with respect to the target rearward chamber hydraulic pressure Pref. A pressure holding mode is set in at least one of the case where the target rearward chamber hydraulic pressure Pref is substantially constant and the case where the actual rearward chamber hydraulic pressure P* falls within a set range which is determined by the target rearward chamber hydraulic pressure Pref.

It is noted that the control mode may be determined in any other methods.

Figure 5:
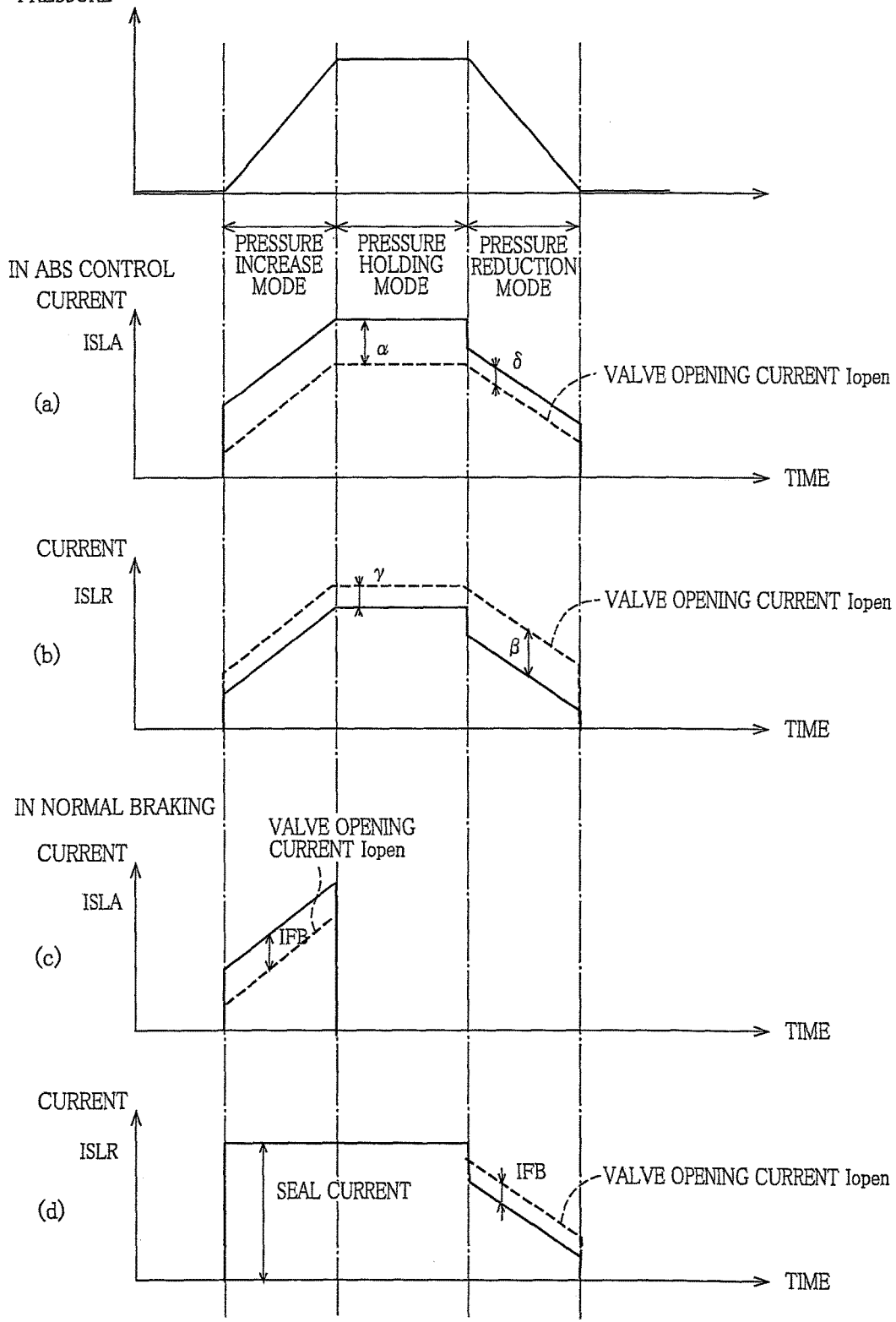
FIG. 5 is a view illustrating modes of control of currents to be supplied to coils of the pressure-increase linear valve and the pressure-reduction linear valve in the hydraulic braking system.

In the pressure increase mode, as illustrated in FIGS. 5(c) and 5(d), the pressure-increase linear valve (SLA) 160 and the pressure-reduction linear valve (SLR) 162 are controlled so as to be in the open state and the closed state, respectively. A current (Iopen+IFB) is supplied to the coil 160s of the pressure-increase linear valve 160, and the current (Iopen+IFB) is the sum of a valve opening current Iopen which is determined by the characteristic illustrated in FIG. 2(b) and the pressure differential determined by the target rearward chamber hydraulic pressure Pref and a value detected by the accumulator pressure sensor 109; and a feedback current IFB determined based on a deviation between the actual rearward chamber hydraulic pressure P* and the target rearward chamber hydraulic pressure Pref. A current (which may be hereinafter referred to as "seal current Iseal") enough to keep the pressure-reduction linear valve 162 in the closed state is supplied to the coil 162s of the pressure-reduction linear valve 162. In the pressure reduction mode, the pressure-increase linear valve 160 and the pressure-reduction linear valve 162 are controlled so as to be in the closed state and the open state, respectively. No current is supplied to the coil 160s of the pressure-increase linear valve 160. A current (Iopen+IFB) is supplied to the coil 162s of the pressure-reduction linear valve 162, and the current (Iopen+IFB) is the sum of: a valve opening current Iopen determined by the target rearward chamber hydraulic pressure Pref and the table in FIG. 3(b); and a feedback current IFB (<0) determined based on a deviation between the actual rearward chamber hydraulic pressure P* and the target rearward chamber hydraulic pressure Pref. In the pressure holding mode, each of the pressure-increase linear valve 160 and the pressure-reduction linear valve 162 is controlled so as to be in the closed state. No current is supplied to the coil 160s of the pressure-increase linear valve 160, and the seal current Iseal is supplied to the coil 162s of the pressure-reduction linear valve 162.

FIG. 6(b) conceptually illustrates states of controls for the pressure-increase linear valve 160 and the pressure-reduction linear valve 162.

In the pressure increase mode, the pressure-increase linear valve 160 is open within a period in which the actual rearward chamber hydraulic pressure P* is lower than the target rearward chamber hydraulic pressure Pref, and the pressure-increase linear valve 160 is closed when the actual rearward chamber hydraulic pressure P* has reached substantially the target rearward chamber hydraulic pressure Pref. The pressure-reduction linear valve 162 is kept closed within a period in which the actual rearward chamber hydraulic pressure P* is lower than a magnitude (Pref+Px) obtained by adding a hydraulic pressure (Px) to the target rearward chamber hydraulic pressure Pref.

In the pressure reduction mode, the pressure-reduction linear valve 162 is open within a period in which the actual rearward chamber hydraulic pressure P* is higher than the target rearward chamber hydraulic pressure Pref, and the pressure-reduction linear valve 162 is closed when the actual rearward chamber hydraulic pressure P* has reached substantially the target rearward chamber hydraulic pressure Pref. The pressure-increase linear valve 160 is kept closed.

As described above, the current supplied to each of the respective coils 160s, 162s of the pressure-increase linear valve 160 and the pressure-reduction linear valve 162 is principally controlled such that a corresponding one of the pressure-increase linear valve 160 and the pressure-reduction linear valve 162 is closed when the actual rearward chamber hydraulic pressure P* is equal to substantially the target rearward chamber hydraulic pressure Pref. In principal, both of the pressure-increase linear valve 160 and the pressure-reduction linear valve 162 are not in the open state at the same time.

[Anti-Lock Control (ABS)]

Anti-lock control is initiated when a braking force acting on each of the wheels 2, 8 becomes excessively high with respect to a coefficient of friction of a road surface. In the anti-lock control, the slip control device 16 controls the hydraulic pressures in the respective brake cylinders 6, 12 individually to restrain slipping of the wheels 2, 8 under braking, so that each of the hydraulic pressures in the respective brake cylinders 6, 12 is kept within an appropriate range determined by the coefficient of friction of the road surface.

{Control of Slip Control Device}

The current to be supplied to the coil of each pressure holding valve 200 is controlled such that the actual pressure differential is brought closer to the target pressure differential between the estimated hydraulic pressure in the corresponding one of the front pressure chambers 40, 42 and the target hydraulic pressure in the corresponding one of the brake cylinders 6, 12.

Since the present hydraulic braking system does not include sensors for detecting the hydraulic pressures in the respective front pressure chambers 40, 42, the hydraulic pressures in the respective front pressure chambers 40, 42 are estimated, as hydraulic pressures Pm, based on the target hydraulic pressures in the respective front pressure chambers 40, 42 which are determined by the requested hydraulic braking force. Also, it is possible to consider that each of the hydraulic pressures in the respective brake cylinders 6, 12 is equal to a corresponding one of the hydraulic pressures in the respective front pressure chambers 40, 42 before the initiation of the anti-lock control. Thus, after the initiation of the anti-lock control, the hydraulic pressures in the respective front pressure chambers 40, 42 are estimated, as hydraulic pressures Pw, based on the estimated hydraulic pressure in the corresponding one of the front pressure chambers 40, 42 just before the initiation of the anti-lock control and based on the control modes of the pressure holding valve 200 and the pressure reduction valve 204. A target hydraulic pressure Pwref in each of the brake cylinders 6, 12 is obtained based on, e.g., a slipping state of a corresponding one of the wheels 2, 8. In view of the above, an amount of the current to be supplied to the coil of each pressure holding valve 200 is determined such that the actual pressure differential (Pm−Pw) is brought closer to the target pressure differential (Pm−Pwref), and then a duty ratio for controlling the supply current is determined.

The current to be supplied to the coil of each pressure reduction valve 204 is controlled such that the estimated hydraulic pressure Pw in the corresponding one of the brake cylinders 6, 12 is brought closer to the target hydraulic pressure Pwref. Each pressure reduction valve 204 is switched to the open state in the case where the corresponding one of the hydraulic pressures in the respective brake cylinders 6, 12 is reduced.

During the anti-lock control, the pump devices 206F, R are operated to pump up the working fluid out of the respective pressure reduction reservoirs 202F, R and transfer the working fluid back to the respective upstream portions 214F, R (which are located upstream of the pressure holding valve 200 and the brake cylinders 6, 12).

In some cases, hydraulic pressures in the respective upstream portions 214F, R vibrate due to operations of the slip control device 16.

For example, each of the hydraulic pressures in the respective brake cylinders 6, 12 is reduced with respect to the corresponding one of the hydraulic pressures in the respective front pressure chambers 40, 42 due to the operations of the pressure reduction valve 204 and the pressure holding valve 200 during the anti-lock control, resulting in generation of a hydraulic pressure difference between each of the brake cylinders 6, 12 and the corresponding one of the front pressure chambers 40, 42. Thus, the hydraulic pressure in the upstream portion 214 may be vibrated with opening and closing of the pressure holding valve 200. In another case, the hydraulic pressure in the upstream portion 214 may be vibrated by, e.g., pulsation due to the operations of the pumps 208F, R. The vibrations of the hydraulic pressure which are caused by the pulsation due to the operations of the pumps 208F, R are vibrations with a frequency of greater than or equal to a set value.

Figure 9:
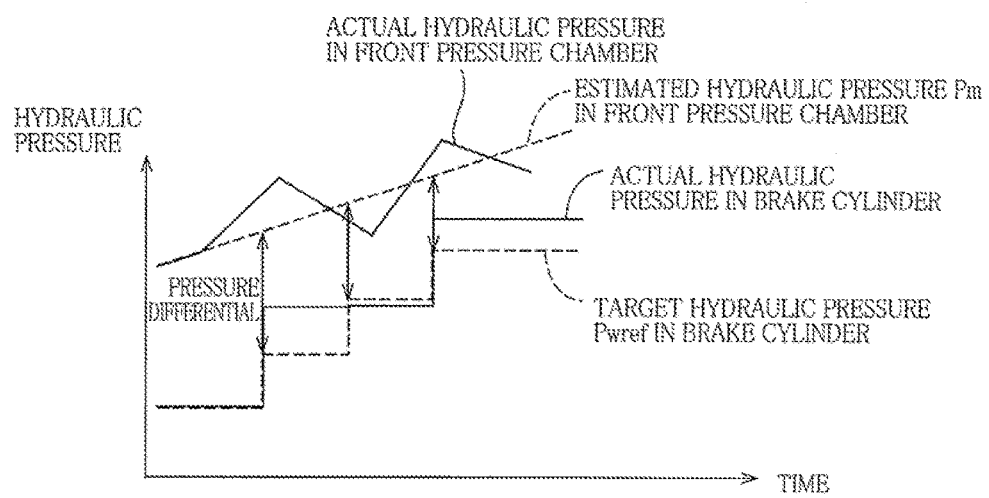
FIG. 9 is a view illustrating a relationship between a hydraulic pressure in a front pressure chamber and a hydraulic pressure in a hydraulic brake cylinder for explaining problems to be solved by the present invention.

In the case where the hydraulic pressures in the respective upstream portions 214F, R, i.e., the hydraulic pressures in the respective front pressure chambers 40, 42 are vibrated, control accuracy for the hydraulic pressure in the brake cylinder 12 may be lowered, unfortunately. In the anti-lock control, as described above, the hydraulic pressure in each of the brake cylinders 6, 12 is controlled based on the estimated hydraulic pressure Pm in the corresponding one of the front pressure chambers 40, 42. Thus, as illustrated in FIG. 9, in the case where the actual hydraulic pressure in each of the front pressure chambers 40, 42 differs from the estimated hydraulic pressure Pm, control accuracy for the hydraulic pressures in the respective brake cylinders 6, 12 is lowered.

The vibrations of the hydraulic pressures in the respective upstream portions 214F, R, i.e., the vibrations of the hydraulic pressures in the respective front pressure chambers 40, 42 are transferred to the rearward chamber 66 via the pressurizing piston 34 and then transferred to the control pressure chamber 122 via the control piston 114 of the regulator 102. Thus, it is also possible to consider that the current to be supplied to the linear valve device 103 is increased and reduced following the vibrations of the hydraulic pressure in the control pressure chamber 122 to suppress the vibrations. However, it is difficult to suppress the vibrations by increasing and reducing the current to be supplied to the linear valve device 103 following the vibrations of the hydraulic pressures in the respective upstream portions 214F, R.

{Control of Linear Valve Device}

In order to solve this problem, the stiffness in the control pressure chamber 122 is reduced in the present embodiment.

As illustrated in FIGS. 5(a) and 5(b), in the case where the pressure increase mode is set, a current (Iopen+$\alpha$) is supplied to the coil 160s of the pressure-increase linear valve 160, and a current (Iopen−$\gamma$) is supplied to the coil 162s of the pressure-reduction linear valve 162. The current (Iopen+$\alpha$) is a current obtained by adding a set current $\alpha$ to the valve opening current Iopen determined by the characteristic illustrated in FIG. 2(b) and the pressure differential between the target rearward chamber hydraulic pressure Pref and the accumulator pressure. The current (Iopen−$\gamma$) is a current obtained by subtracting a set current $\gamma$ (>0) from the valve opening current Iopen determined by the target rearward chamber hydraulic pressure Pref and the characteristic illustrated in FIG. 3(b). The above-described operations in the pressure increase mode are also performed in the case where the pressure holding mode is set.

In the case where the pressure reduction mode is set, a current (Iopen+$\delta$) obtained by adding a set current $\delta$ to the valve opening current Iopen is supplied to the coil 160s of the pressure-increase linear valve 160, and a current (Iopen−$\beta$) obtained by subtracting a set current $\beta$ (>0) from the valve opening current Iopen is supplied to the coil 162s of the pressure-reduction linear valve 162. It is noted that the set current $\alpha$ is greater than the set current $\delta$ ($\alpha$>$\delta$), and the set current $\beta$ is greater than the set current $\gamma$ ($\beta$>$\gamma$).

FIG. 6(a) conceptually illustrates states of controls for the pressure-increase linear valve 160 and the pressure-reduction linear valve 162.

In the pressure increase mode and the pressure holding mode, the pressure-increase linear valve 160 is open within a period in which the actual rearward chamber hydraulic pressure P* is lower than a hydraulic pressure (Pref+P$\alpha$) obtained by adding a set pressure P$\alpha$ determined by, e.g., the set current $\alpha$ to the target rearward chamber hydraulic pressure Pref, and the pressure-increase linear valve 160 is closed when the actual rearward chamber hydraulic pressure P* has reached the hydraulic pressure (Pref+P$\alpha$). The pressure-reduction linear valve 162 is open within a period in which the actual rearward chamber hydraulic pressure P* is higher than a hydraulic pressure (Pref−P$\gamma$) obtained by subtracting a set pressure P determined by the set current $\gamma$ from the target rearward chamber hydraulic pressure Pref, and the pressure-reduction linear valve 162 is closed when the actual rearward chamber hydraulic pressure P* has reached the hydraulic pressure (Pref−P$\gamma$). Thus, both of the pressure-increase linear valve 160 and the pressure-reduction linear valve 162 are in the open state within a period in which the actual rearward chamber hydraulic pressure P* falls within a set range determined by the target hydraulic pressure Pref {(Pref−P$\gamma$)<P*<(Pref+P$\alpha$)}. This state allows the working fluid to flow into and out of the pressure-increase linear valve 160 and the pressure-reduction linear valve 162 (via restrictors) in the control pressure chamber 122, allowing change in volume of the control pressure chamber 122 (i.e., increase and reduction in volume of the control pressure chamber 122), resulting in reduced stiffness in the control pressure chamber 122. As a result, the vibrations of the hydraulic pressure in the control pressure chamber 122 are absorbed.

As illustrated in FIG. 6(a), since the set current $\alpha$ is greater than the set current $\gamma$, an amount of opening of the pressure-increase linear valve 160 is greater than an amount of opening of the pressure-reduction linear valve 162 in the case where the actual rearward chamber hydraulic pressure P* is substantially equal to the target rearward chamber hydraulic pressure Pref. In other words, the hydraulic pressure <P*> at which the amount of opening of the pressure-increase linear valve 160 and that of the pressure-reduction linear valve 162 are equal to each other is greater than the target rearward chamber hydraulic pressure Pref. As a result, the actual rearward chamber hydraulic pressure P* does not easily become lower than the target rearward chamber hydraulic pressure Pref.

In the pressure reduction mode, likewise, the pressure-increase linear valve 160 is open within a period in which the actual rearward chamber hydraulic pressure P* is lower than a hydraulic pressure (Pref+P$\delta$) obtained by adding a set pressure P$\delta$ determined by, e.g., the set current $\delta$ to the target rearward chamber hydraulic pressure Pref. The pressure-reduction linear valve 162 is open within a period in which the actual rearward chamber hydraulic pressure P* is higher than a hydraulic pressure (Pref−P$\beta$) obtained by subtracting a set pressure P$\beta$ determined by, e.g., the set current $\beta$ from the target rearward chamber hydraulic pressure Pref. As a result, both of the pressure-increase linear valve 160 and the pressure-reduction linear valve 162 are in the open state within a period in which the actual rearward chamber hydraulic pressure P* falls within a set range determined by the target rearward chamber hydraulic pressure Pref {(Pref−P$\beta$)<P*<(Pref+P$\delta$)}. Since the set current $\beta$ is greater than the set current $\delta$, an amount of opening of the pressure-reduction linear valve 162 is greater than an amount of opening of the pressure-increase linear valve 160. The hydraulic pressure <P*> at which the amount of opening of the pressure-reduction linear valve 162 and that of the pressure-increase linear valve 160 are equal to each other is less than the target rearward chamber hydraulic pressure Pref. As a result, the actual rearward chamber hydraulic pressure P* does not easily become higher than the target rearward chamber hydraulic pressure Pref.

Figure 7:
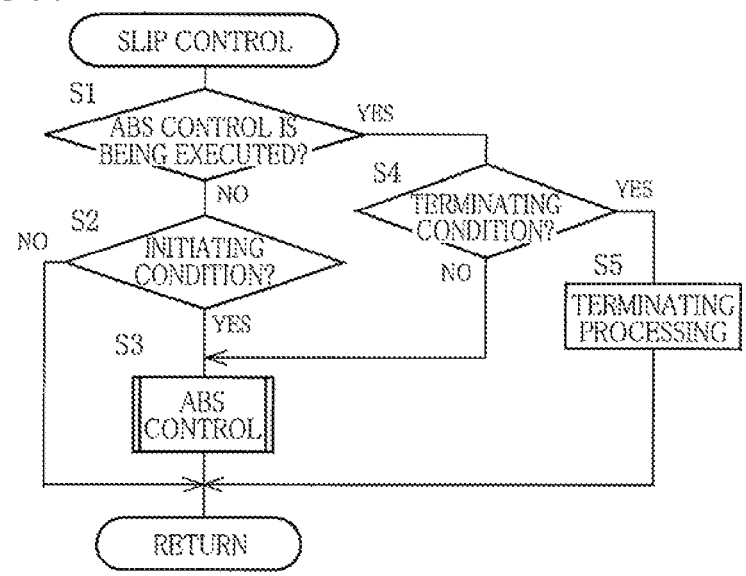
FIG. 7 is a flow chart illustrating a slip control program stored in a storage device of the brake ECU.

The slip control device 16 is controlled by execution of a slip control program illustrated in a flow chart in FIG. 7.

At Step S1 (hereinafter, "Step" is omitted where appropriate), it is determined whether the anti-lock control is being executed. When the anti-lock control is not being executed, it is determined at S2 whether initiating conditions are satisfied. For example, it is determined that the initiating conditions are satisfied in the case where the wheel is slipped excessively under braking. When the initiating conditions are not satisfied, the slip control device 16 is not controlled.

When the initiating conditions are satisfied, the anti-lock control is executed at S3. When the anti-lock control is initiated, an anti-lock control flag is set. The currents to be supplied to the pressure holding valve 200 and the pressure reduction valve 204 are controlled as described above. Also, the pump motor 210 is activated to cause the pump 208 to pump up the working fluid out of the pressure reduction reservoir 202 and transfer the working fluid to the upstream portion 214.

During the anti-lock control, it is determined at S4 whether terminating conditions are satisfied. For example, it is determined that the terminating conditions are satisfied in the case where an operation for the brake pedal 24 is canceled or in the case where slipping of the wheel under braking is kept within an appropriate range. When the terminating conditions are not satisfied, a negative decision (NO) is made, and the processings at S1, S4, and S3 are executed repeatedly to continue the anti-lock control. When the terminating conditions are satisfied, a processing for terminating the anti-lock control is executed at S5. The pump motor 210 is stopped, and the pressure holding valve 200 and the pressure reduction valve 204 are returned to their respective original positions.

Figure 8:
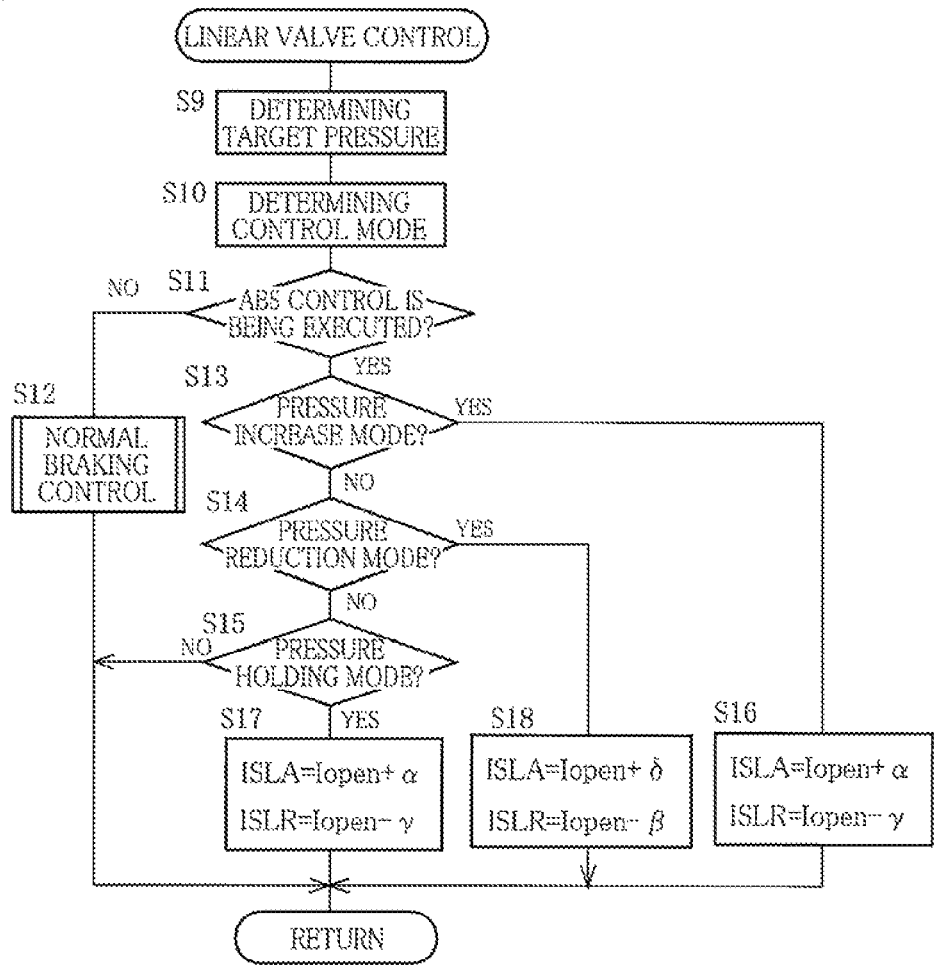
FIG. 8 is a flow chart illustrating a linear-valve control program stored in the storage device of the brake ECU.

The linear valve device 103 is controlled in accordance with execution of a linear-valve control program illustrated in a flow chart in FIG. 8.

The target rearward chamber hydraulic pressure Pref is determined at S9 based on a requested braking force. The control mode is determined at S10 based on elements including a tendency of change in the target rearward chamber hydraulic pressure Pref.

At S11, it is determined whether the anti-lock control is being executed. When the anti-lock control is not being executed, the normal braking control is executed at S12 as needed. Supply currents ISLA, ISLR to be supplied to the respective coils 160s, 162s of the pressure-increase linear valve 160 and the pressure-reduction linear valve 162 are as follows.

The relationship "(ISLA, ISLR)={(Iopen+IFB), Iseal}" is established in the pressure increase mode. The relationship "(ISLA, ISLR)=(0, Iseal)" is established in the pressure holding mode. The relationship "(ISLA, ISLR)={0, (Iopen−IFB)}" is established in the pressure reduction mode.

In the case where the anti-lock control is being executed, it is determined at S13-S15 whether the control mode is any of the pressure increase mode, the pressure holding mode, and the pressure reduction mode. When the control mode is the pressure increase mode, the supply current ISLA to be supplied to the coil 160s of the pressure-increase linear valve 160 and the supply current ISLR to be supplied to the coil 162s of the pressure-reduction linear valve 162 are determined at S16 as follows:

$ISLA = Iopen + \alpha$ $ISLR = Iopen - \gamma$

When the control mode is the pressure holding mode, a positive decision (YES) is made at S15, and the same processing as executed when the control mode is the pressure increase mode is executed at S17. When the control mode is the pressure reduction mode, a positive decision (YES) is made at S14, and the supply current ISLA and the supply current ISLR are determined at S18 as follows:

$ISLA = Iopen + \delta$ $ISLR = Iopen - \beta$

In the present embodiment as described above, when the anti-lock control is being executed, both of the pressure-increase linear valve 160 and the pressure-reduction linear valve 162 are switched to the open state, which allows change in volume of the control pressure chamber 122, resulting in reduced stiffness. The vibrations of the hydraulic pressure in the control pressure chamber 122 due to the operation of the slip control device 16 are well absorbed, making it possible to suppress the vibrations of the hydraulic pressures in the respective front pressure chambers 40, 42.

Also, the currents to be supplied to the pressure-increase linear valve 160 and the pressure-reduction linear valve 162 are not increased or reduced with vibrations. Accordingly, it is possible to well absorb even vibrations with a large frequency such as vibrations caused by pulsation of the pump device 206. This eliminates the need for providing a damper, avoiding increase in size of the hydraulic braking system, resulting in reduced increase in cost.

In the case where the pressure increase mode is set, the amount of opening of the pressure-increase linear valve 160 is made greater than the amount of opening of the pressure-reduction linear valve 162, and in the case where the pressure reduction mode is set, the amount of opening of the pressure-reduction linear valve 162 is made greater than the amount of opening of the pressure-increase linear valve 160. Accordingly, the actual rearward chamber hydraulic pressure P* can be controlled to have a magnitude near that of the target rearward chamber hydraulic pressure Pref, thereby improving the control accuracy for the hydraulic pressure in the brake cylinder in the anti-lock control, which can well avoid a long braking distance.

In the hydraulic braking system disclosed in Patent Document 1, in contrast, the opening and closing switching pressure of the pressure-increase linear valve provided on an upstream portion which is located upstream of the pressure holding valve is increased, and the opening and closing switching pressure of the pressure-reduction linear valve is increased, resulting in increase in stiffness in the upstream portion. Thus, the technique disclosed in Patent Document 1 differs from the invention of the present application.

In the present embodiment, portions of the brake ECU 20 which store and execute the processings at S16-S18 in the linear-valve control program illustrated in the flow chart in FIG. 8 constitute a stiffness reducer, a rearward chamber stiffness reducer, a control-pressure-chamber stiffness reducer, a pressure-reduction linear valve controller, a pressure-increase linear valve controller, an opening controller, and a volume-change allowing portion, for example. Portions of the brake ECU 20 which store and execute the processing at S16 constitute a target-hydraulic-pressure-change-based pressure-increase linear valve controller, for example. Portions of the brake ECU 20 which store and execute the processing at S18 constitute a target-hydraulic-pressure-change-based pressure-reduction linear valve controller, for example. Portions of the brake ECU 20 which store and execute the processings at S12-S18 constitute a control-pressure-chamber hydraulic pressure controller, for example. Portions of the brake ECU 20 which store and execute the processing at S9 constitute a target hydraulic pressure determiner, for example.

Also, portions of the brake ECU 20 which store and execute the processing at S3 in the slip control program illustrated in the flow chart in FIG. 7 constitute a slip controller, for example. Each of the pressure holding valve 200 and the pressure reduction valve 204 constitutes a slip-control electromagnetic valve, for example.

Second Embodiment

Figure 10:
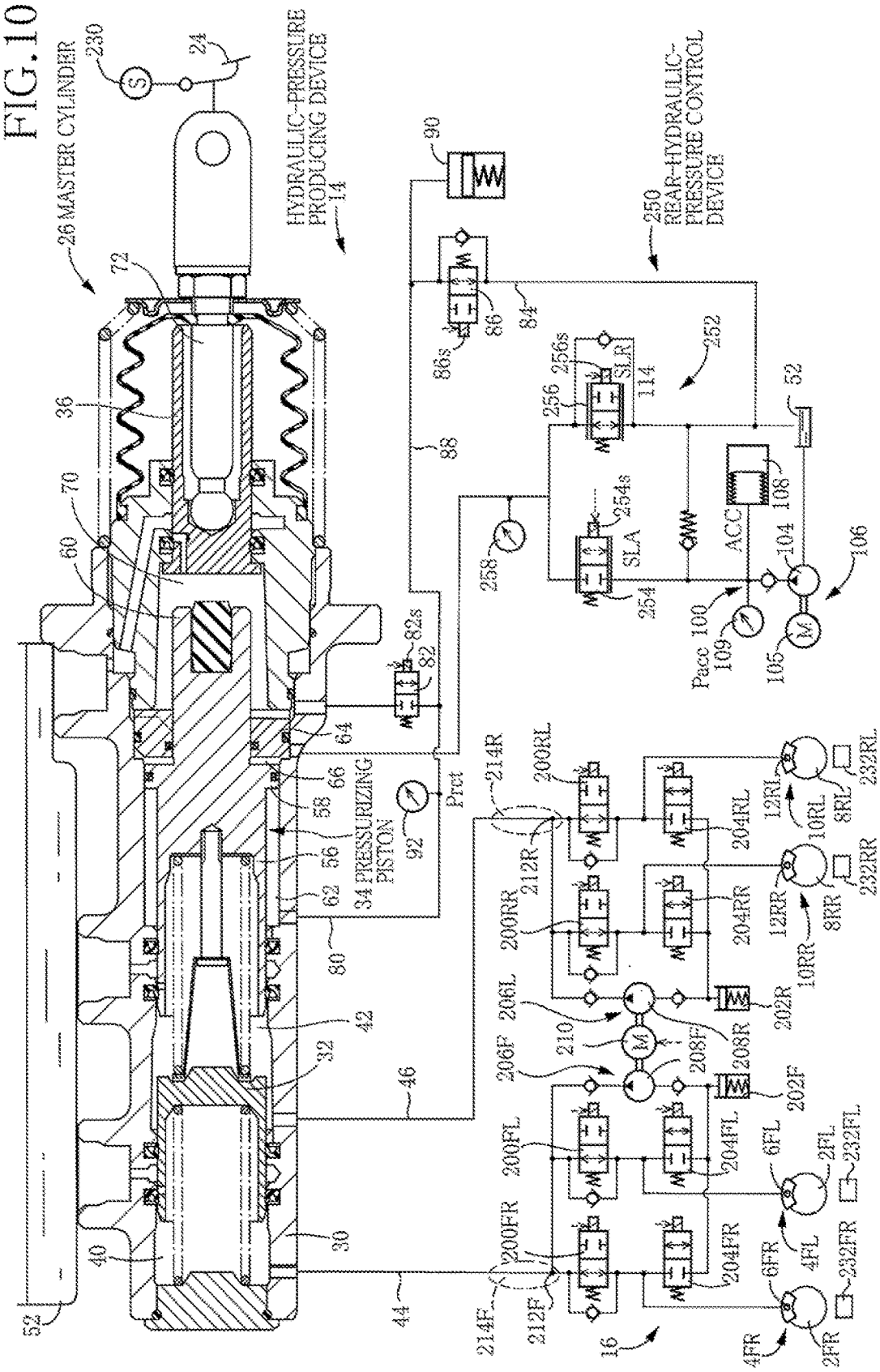
FIG. 10 is a circuit diagram of a hydraulic braking system according to a second embodiment of the present invention.

The hydraulic braking system may be configured as illustrated in FIG. 10. In the hydraulic braking system according to the present embodiment, the hydraulic pressure in the rearward chamber 66 is directly controlled by control for the pressure-increase linear valve and the pressure-reduction linear valve. It is noted that the same reference numerals as used in the first embodiment are used to designate the corresponding elements of this embodiment, and an explanation of which is dispensed with.

In the present hydraulic braking system, a rear-hydraulic-pressure control device 250 is connected to the rearward chamber 66. The rear-hydraulic-pressure control device 250 does not include the regulator but includes the high pressure source 100 and a linear valve device 252. The linear valve device 252 includes: a pressure-increase linear valve 254 as a rearward chamber pressure-increase linear valve provided between the high pressure source 100 and the rearward chamber 66; and a pressure-reduction linear valve 256 as a rearward chamber pressure-reduction linear valve provided between the rearward chamber 66 and the master reservoir 52. Also, a rearward chamber hydraulic sensor 258 is provided for detecting the hydraulic pressure in the rearward chamber 66.

In the present embodiment, currents to be supplied to a coil 254s of the pressure-increase linear valve 254 and a coil 256s of the pressure-reduction linear valve 256 are controlled as in the first embodiment. In the case where the hydraulic pressure in the rearward chamber 66 falls within a set range determined by the target rearward chamber hydraulic pressure Pref, the pressure-increase linear valve 254 and the pressure-reduction linear valve 256 are opened, allowing change in volume of the rearward chamber 66, resulting in lower stiffness. The vibrations of the hydraulic pressure are absorbed in the rearward chamber 66, thereby well suppressing the vibrations of the hydraulic pressures in the respective front pressure chambers 40, 42, resulting in improved control accuracy for the hydraulic pressures in the respective brake cylinders 6, 12.

In the present embodiment, portions of the brake ECU 20 which store and execute the linear-valve control program constitute a rearward chamber hydraulic pressure controller. Portions of the brake ECU 20 which store and execute the processings at S16-S18 in the linear-valve control program constitute a direct rearward chamber stiffness reducer, for example.

It is noted that the construction of the master cylinder is not limited to the construction in the first and second embodiments. The master cylinder may have any construction as long as the master cylinder includes the rearward chamber provided at a rear of the pressurizing piston.

Third Embodiment

Figure 11:
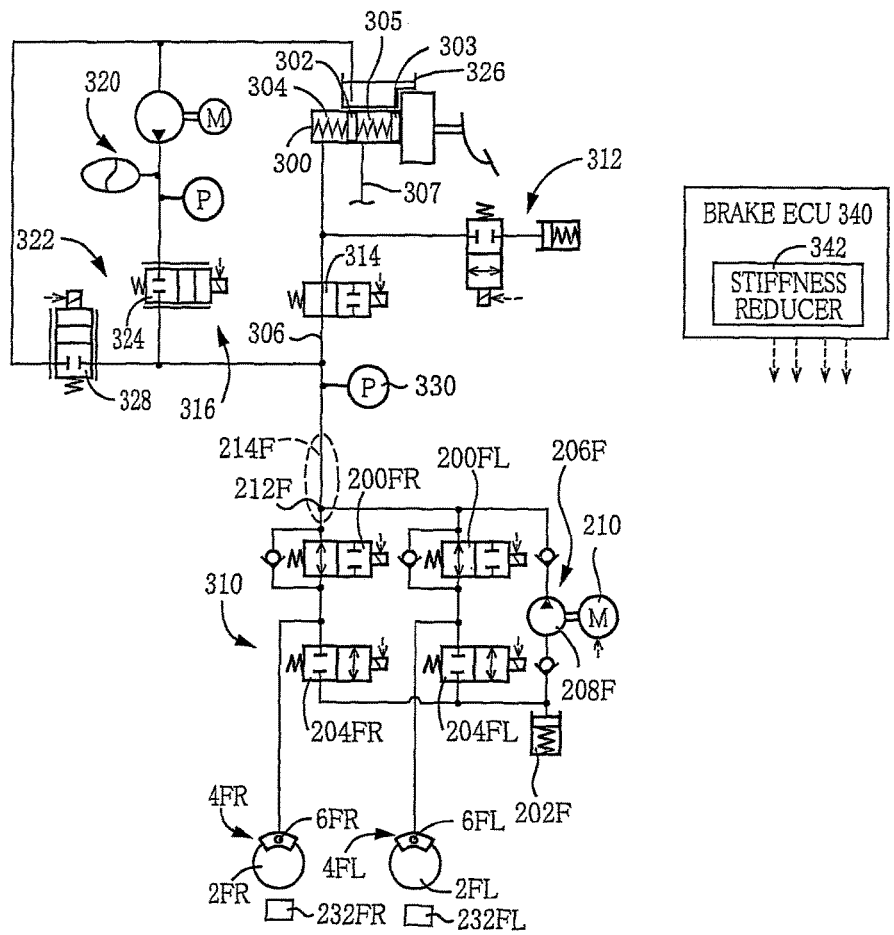
FIG. 11 is a circuit diagram of a hydraulic braking system according to a third embodiment of the present invention.

The hydraulic braking system may be configured as illustrated in FIG. 11. It is noted that the same reference numerals as used in the first and second embodiments are used to designate the corresponding elements of this embodiment, and an explanation of which is dispensed with.

The present hydraulic braking system has front and rear lines. A master cylinder 300 includes two pressurizing pistons 302, 303. Front pressure chambers 304, 305 are defined in front of the respective pressurizing pistons 302, 303. The brake cylinders 6 for the front left and right wheels and the brake cylinders for the rear left and right wheels are connected to the respective front pressure chambers 304, 305 via respective master passages 306, 307. FIG. 11 illustrates brake lines for the front wheels but omits illustration of brake lines for the rear wheels.

A slip control device 310 is provided between the front pressure chamber 304 and the brake cylinders 6FL, FR of the respective front left and right wheels 2FL, FR. Since the configuration of the slip control device 310 is similar to a portion of the configuration of the slip control device 16 in the first embodiment, the same reference numerals as used in the first embodiment are used to designate the corresponding elements of this embodiment, and an explanation of which is dispensed with.

At a portion of the master passage 306 between the upstream portion 214F and the front pressure chamber 304, a stroke simulator device 312, a master cut-off valve 314, and an upstream control device 316 are provided in this order from upstream side. The master cut-off valve 314 is a normally-open electromagnetic open/close valve. The stroke simulator device 312 includes a normally-closed simulator control valve and a stroke simulator.

The upstream control device 316 includes a power hydraulic pressure source 320 as a high pressure source and a linear valve device 322. The linear valve device 322 includes: a pressure-increase linear valve 324 as a normally-closed upstream pressure-increase linear valve provided between the high pressure source 320 and the upstream portion 214F; and a pressure-reduction linear valve 328 as a normally-closed upstream pressure-reduction linear valve provided between the upstream portion 214F and a reservoir 326. The hydraulic pressure in the upstream portion 214F is detected by a hydraulic sensor 330.

Components such as the slip control device 310 and the linear valve device 322 are controlled by, e.g., a brake ECU 340 mainly constituted by a computer.

[Normal Braking Control]

When the master cut-off valve 314 is switched to its closed state, the upstream portion 214F is isolated from the front pressure chamber 304, and the linear valve device 322 is controlled to control the hydraulic pressure in the upstream portion 214F, thereby controlling the hydraulic pressures in the brake cylinders 6 for the respective front left and right wheels in common. A target hydraulic pressure in the upstream portion 214F is determined based on a requested braking force of the driver. The linear valve device 322 is controlled such that an actual hydraulic pressure in the upstream portion 214F which is detected by the hydraulic sensor 330 is brought closer to the target hydraulic pressure. The slip control device 16 is in its non-operating state, the pump motor 210 is in the rest state.

[Anti-Lock Control]

The hydraulic pressures in the respective brake cylinders 6FL, FR are controlled by the linear valve device 322 in common and are individually controlled by the slip control device 310.

Figure 12:
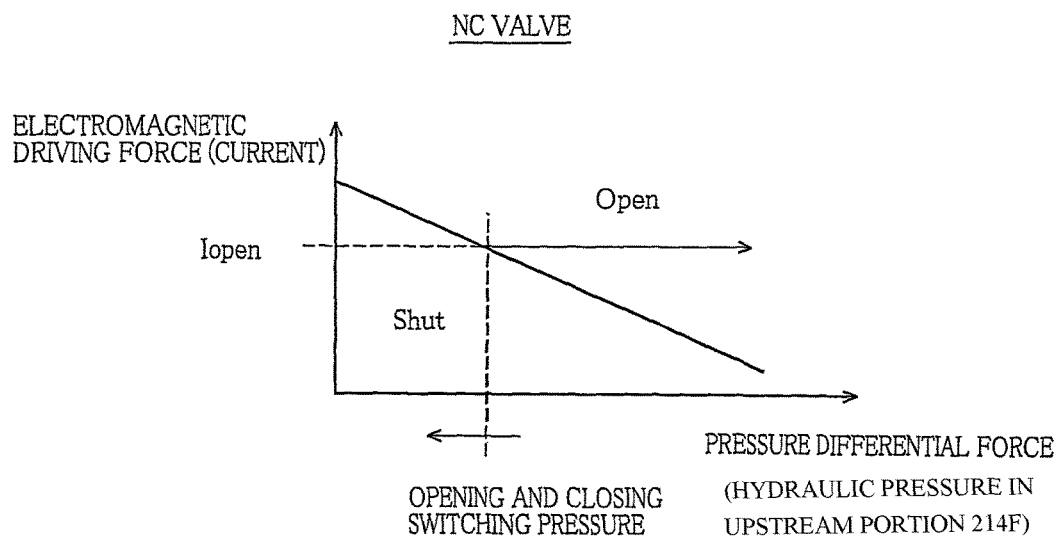
FIG. 12 is a view for explaining control of the pressure-reduction linear valve of the hydraulic braking system according to the above-described embodiment and for explaining a relationship between a pressure differential and a valve opening current with comparison between a normally open valve and a normally closed valve.

The hydraulic pressure in the upstream portion 214F is controlled by the linear valve device 322. The pressure-increase linear valve 324 is controlled in the same manner as in the first embodiment. In the case where the pressure increase mode or the pressure holding mode is set, a current (Iopen+α') is supplied to the pressure-increase linear valve 324. In the case where the pressure reduction mode is set, a current (Iopen+δ') is supplied to the pressure-increase linear valve 324. Since the pressure-reduction linear valve 328 is a normally closed valve, the pressure-reduction linear valve 328 has a construction similar to that of the pressure-increase linear valve 324 and has a characteristic similar to the characteristic illustrated in FIG. 2(b) (see FIG. 12). As illustrated in FIG. 12, the supply current is increased, and the opening and closing switching pressure is reduced during the anti-lock control is being executed. In the case where the pressure increase mode or the pressure holding mode is set, a current (Iopen+γ') is supplied to the pressure-reduction linear valve 328. In the case where the pressure reduction mode is set, a current (Iopen+β') is supplied to the pressure-reduction linear valve 328.

Also in the present embodiment as described above, in the case where the hydraulic pressure in the upstream portion 214F is within the set range determined by the target hydraulic pressure, each of the pressure-increase linear valve 324 and the pressure-reduction linear valve 328 is open. As a result, the vibrations of the hydraulic pressure in the upstream portion 214F in the anti-lock control are suppressed, thereby improving the control accuracy for the hydraulic pressure in the brake cylinder, which can well avoid a long braking distance.

In the present embodiment, a portion of the brake ECU 340 which controls the pressure-increase linear valve 324 and the pressure-reduction linear valve 328 constitutes a stiffness reducer 342, for example.

It is noted that it is not essential that the upstream control device 316 includes the linear valve device 322. The power hydraulic pressure source 320 may be controlled to suppress the vibrations in the upstream portion 214F.

Fourth Embodiment

Figure 13:
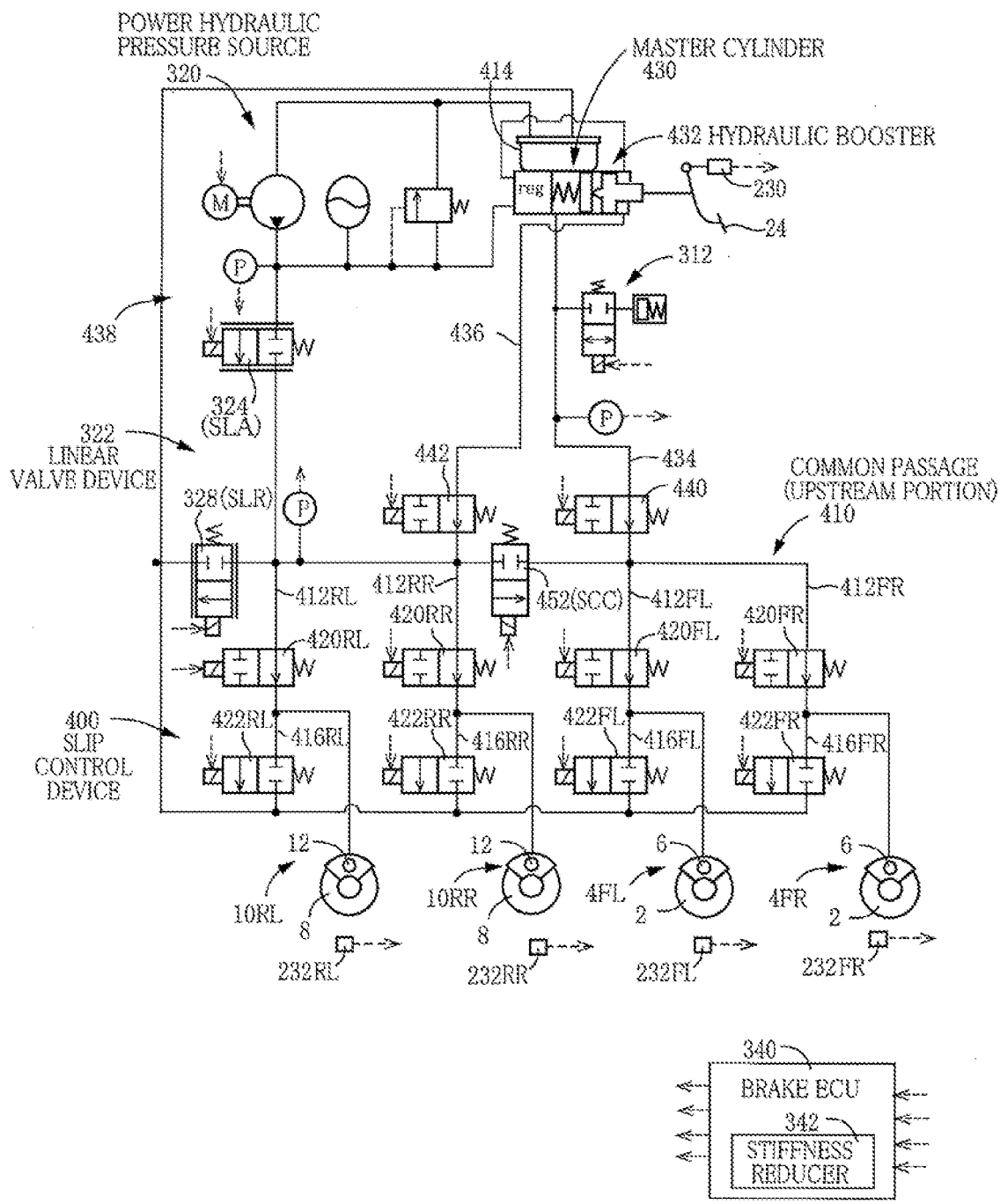
FIG. 13 is a circuit diagram of a hydraulic braking system according to a fourth embodiment of the present invention.

The hydraulic braking system may be configured as illustrated in FIG. 13. It is noted that the same reference numerals as used in the first through third embodiments are used to designate the corresponding elements of this embodiment, and an explanation of which is dispensed with.

The hydraulic braking system illustrated in FIG. 13 includes a slip control device 400 of a discharge type and does not include a pump device.

The brake cylinders 6FL, FR, 12RL, RR for the respective front left and right and rear left and right wheels 2FL, FR, 8RL, RR are connected to a common passage 410 respectively via individual pressure-increase passages 412FL, FR, RL, RR. The brake cylinders 6FL, FR, 12RL, RR and a master reservoir 414 are connected to each other via respective individual pressure-reduction passages 416FL, FR, RL, RR. Pressure holding valves 420FL, FR, RL, RR are provided on the respective individual pressure-increase passages 412FL, FR, RL, RR. Pressure reduction valves 422FL, FR, RL, RR are provided on the respective individual pressure-reduction passages 416FL, FR, RL, RR.

A master cylinder 430 and a hydraulic booster 432 are connected to the common passage 410 via respective manual passages 434, 436. A hydraulic-pressure producing device 438 is connected to the common passage 410. Manual cut-off valves 440, 442 are provided on the respective manual passages 434, 436. As in the configuration of the hydraulic braking system according to the third embodiment, the hydraulic-pressure producing device 438 includes the power hydraulic pressure source 320 as the high pressure source and the linear valve device 322. The linear valve device 322 includes: a normally-closed pressure-increase linear valve 324 provided between the high pressure source 320 and the common passage 410; and a normally-closed pressure-reduction linear valve 328 provided between the common passage 410 and the master reservoir 414. A normally-closed front/rear cut-off valve 452 is provided on the common passage 410.

In the present embodiment, devices such as the slip control device 400 and the linear valve device 322 are controlled based on instructions of the brake ECU 340 mainly constituted by a computer. The common passage 410 corresponds to the upstream portion.

[Normal Braking Control]

In the normal braking, the manual cut-off valves 440, 442 are closed, and the front/rear cut-off valve 452 is opened. The linear valve device 322 is controlled in a state in which the master cylinder 430 and the hydraulic booster 432 are isolated from the common passage 410, whereby a hydraulic pressure in the common passage 410 is controlled to control the hydraulic pressures in the respective brake cylinders 6, 12 in common.

[Anti-Lock Control]

The hydraulic pressures in the respective brake cylinders 6, 12 are controlled by the linear valve device 322 in common and are individually controlled by the slip control device 400. The hydraulic pressure in the common passage 410 is controlled in the same manner as in the third embodiment. In the case where the pressure increase mode or the pressure holding mode is set, a current (Iopen+α*) is supplied to the pressure-increase linear valve 324. In the case where the pressure reduction mode is set, a current (Iopen+δ*) is supplied to the pressure-increase linear valve 324. In the case where the pressure increase mode or the pressure holding mode is set, a current (Iopen+γ*) is supplied to the pressure-reduction linear valve 328. In the case where the pressure reduction mode is set, a current (Iopen+β*) is supplied to the pressure-reduction linear valve 328.

In the case where the anti-lock control is executed (the slip control device 400 is operated), the stiffness in the upstream portion as the common passage 410 is reduced as described above. Accordingly, it is possible to well suppress vibrations of the hydraulic pressure in the common passage 410 with operations of the pressure holding valve 200 and the pressure reduction valve 204.

Fifth Embodiment

Figure 14:
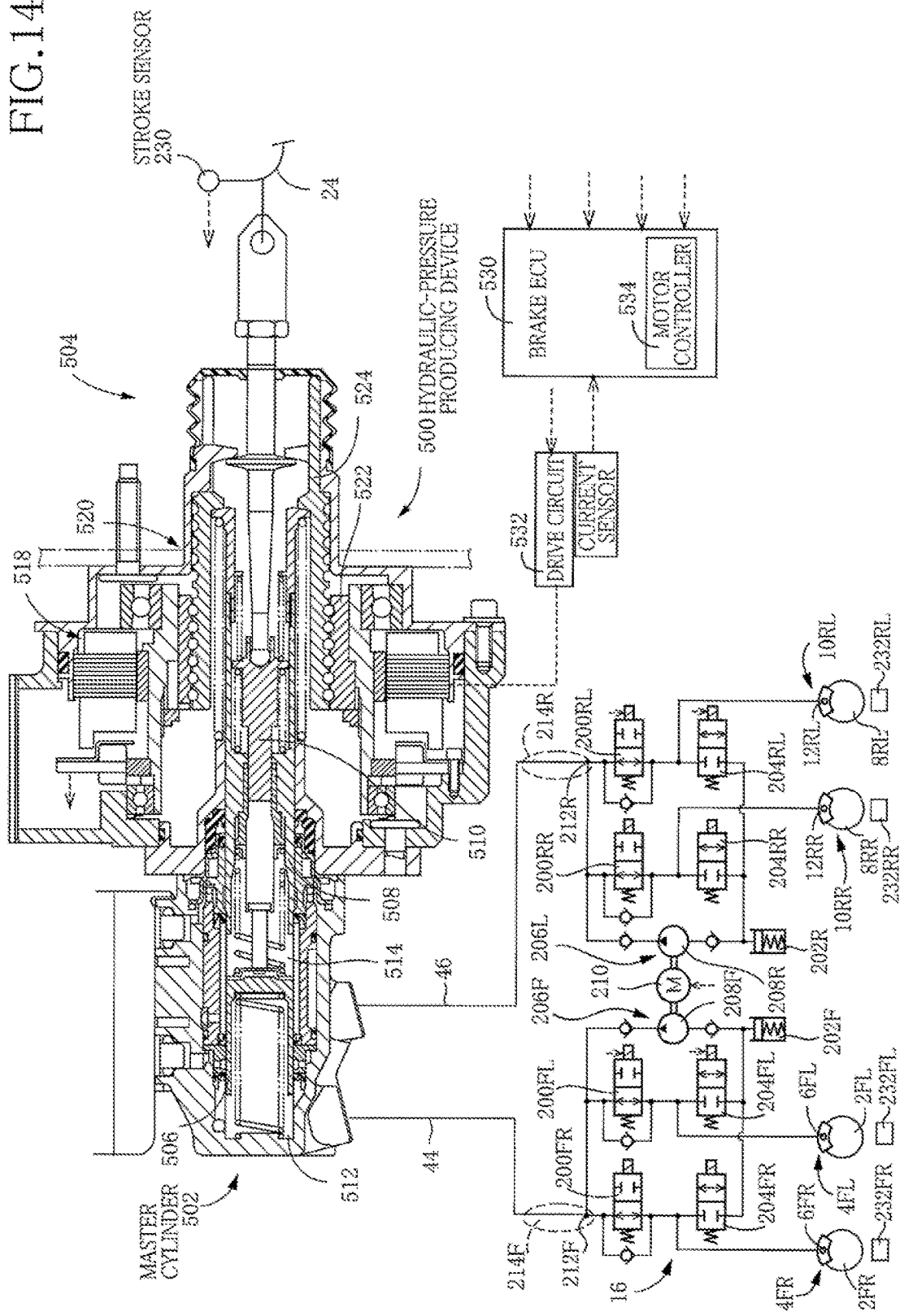
FIG. 14 is a circuit diagram of a hydraulic braking system according to a fifth embodiment of the present invention.

The hydraulic braking system may be configured as illustrated in FIG. 14. It is noted that the same reference numerals as used in the first through fourth embodiments are used to designate the corresponding elements of this embodiment, and an explanation of which is dispensed with. In the hydraulic braking system illustrated in FIG. 14, a hydraulic-pressure producing device 500 includes an electric motor.

The hydraulic-pressure producing device 500 includes a master cylinder 502 and an advancing-force control device 504. The master cylinder 502 includes two pressurizing pistons 506, 508 and an input piston 510 coupled with the brake pedal 24. The input piston 510 is movable relative to the pressurizing piston 508. Front pressure chambers 512, 514 are defined in front of the respective pressurizing pistons 506, 508. The brake cylinders 6, 12 are connected to the respective front pressure chambers 512, 514 via the respective fluid passages 44, 46. The slip control device 16 is provided between each of the brake cylinders 6, 12 and a corresponding one of the front pressure chambers 512, 514.

The advancing-force control device 504 includes an electric motor 518 and a motion converter 520. The motion converter 520 converts rotation of an output shaft 522 of the electric motor 518 to linear motion to move an output member 524 linearly. The motion converter 520 converts rotational power of the electric motor 518 to an advance force to transmit it to the pressurizing piston 508.

Devices connected to a brake ECU 530 include the stroke sensor 230 and the wheel speed sensor 232. Also, the electric motor 518 is connected to the brake ECU 530 via a drive circuit 532. The brake ECU 530 includes a motor controller 534.

[Normal Braking Control]

A current to be supplied to the electric motor 518 is controlled such that a hydraulic pressure in each of the front pressure chambers 512, 514 is brought closer to a magnitude corresponding to a target hydraulic braking force.

[Anti-Lock Control]

The current to be supplied to the electric motor 518 is controlled, and the slip control device 16 is controlled. In the present embodiment, the electric motor 518 is controlled to suppress vibrations of the hydraulic pressure in the respective front pressure chambers 512, 514. For example, the electric motor 518 may be controlled to reduce stiffness in each of the front pressure chambers 512, 514 to suppress the vibrations.

In view of the above, also in the present embodiment, it is possible to well suppress the vibrations in the upstream portions 214F, R which are caused with the operations of the slip control device 16 in the anti-lock control.

It is noted that a normally open valve may be used for the pressure increase valve.

The present invention is not limited to the details of the illustrated embodiments, but may be embodied with various changes and modifications, which may occur to those skilled in the art. For example, the present invention is also applicable to the configuration in which the pump device is operated in traction control or vehicle stability control.

EXPLANATION OF REFERENCE NUMERALS 6, 12: Brake Cylinder, 16: Slip Control Device, 20: Brake ECU, 26: Master Cylinder, 28: Rear-hydraulic-pressure Control Device, 34: Pressurizing Piston, 66: Rearward chamber, 102: Regulator, 114: Control Piston, 122: Control Pressure Chamber, 124: Servo Chamber, 126: High-pressure Supply Valve, 160: Pressure-increase Linear Valve, 162: Pressure-reduction Linear Valve, 200: Pressure Holding Valve, 202: Pressure Reduction Reservoir, 204: Pressure Reduction Valve, 206: Pump Device, 208: Pump, 210: Pump Motor, 214: Upstream Portion, 254: Pressure-increase Linear Valve, 256: Pressure-reduction Linear Valve, 324: Pressure-increase Linear Valve, 328: Pressure-reduction Linear Valve, 340: Brake ECU, 400: Slip Control Device, 504: Advancing-force Control Device, 518: Electric Motor, 520: Motion Converter, 530: Brake ECU

The invention claimed is:

1. A hydraulic braking system, comprising:
a plurality of brake cylinders respectively provided for a plurality of wheels of a vehicle;
a hydraulic-pressure producing device; and
a slip control device provided between the hydraulic-pressure producing device; and the plurality of brake cylinders and configured to control a hydraulic pressure in each of at least one of the plurality of brake cylinders to control a slipping state of each of the plurality of wheels,
the hydraulic-pressure producing device comprising a stiffness reducer configured to reduce stiffness in an upstream portion located upstream of the slip control device such that the stiffness is less when the slip control device is in an operating state than when the slip control device is in a non-operating state,
wherein the stiffness is a value obtained by dividing an amount of increase in force applied to the upstream portion, by an amount of change in volume of the upstream portion.

2. The hydraulic braking system according to claim 1,
wherein the hydraulic-pressure producing device comprises (i) a master cylinder comprising (a) a pressurizing piston fluid-tightly and slidably fitted in a housing, (b) a front pressure chamber provided in front of the pressurizing piston and connected to the upstream portion, and (c) a rearward chamber provided at a rear of the pressurizing piston, and (ii) a rear-hydraulic-pressure control device capable of controlling a hydraulic pressure in the rearward chamber, and
wherein the rear-hydraulic-pressure control device comprises a rearward chamber stiffness reducer configured to reduce stiffness in the rearward chamber to reduce stiffness in the front pressure chamber, and the rearward chamber stiffness reducer is comprised in the stiffness reducer.

3. The hydraulic braking system according to claim 2, wherein the rearward chamber stiffness reducer comprises a volume-change allowing device configured to allow change in volume of the rearward chamber in a greater degree in the case where the slip control device is in the operating state than in the case where the slip control device is in the non-operating state.

4. The hydraulic braking system according to claim 2,
wherein the rear-hydraulic-pressure control device comprises:
(i) a regulator comprising (a) a control piston fluid-tightly and slidably fitted in the housing, (b) a control pressure chamber provided at a rear of the control piston, and (c) a servo chamber provided in front of the control piston and connected to the rearward chamber;
(ii) a pressure-increase linear valve provided between the control pressure chamber and a high pressure source, the pressure-increase linear valve being an electromagnetic valve comprising a coil;
(iii) a pressure-reduction linear valve provided between the control pressure chamber and a low pressure source, the pressure-reduction linear valve being an electromagnetic valve comprising a coil:
(iv) a control-pressure-chamber hydraulic pressure controller configured to control a current to be supplied to the coil of the pressure-increase linear valve and a current to be supplied to the coil of the pressure-reduction linear valve to control a hydraulic pressure in the control pressure chamber to control a hydraulic pressure in the servo chamber, and
wherein the control-pressure-chamber hydraulic pressure controller comprises a control-pressure-chamber stiffness reducer configured to control a current to be supplied to at least one of the coil of the pressure-increase linear valve and the coil of the pressure-reduction linear valve to reduce stiffness in the control pressure chamber such that the stiffness in the control pressure chamber is less in the case where the slip control device is in the operating state than in the case where the slip control device is in the non-operating state, and the control-pressure-chamber stiffness reducer is comprised in the rearward chamber stiffness reducer.

5. The hydraulic braking system according to claim 4,
wherein the pressure-reduction linear valve comprises a characteristic in which the pressure-reduction linear valve is in an open state when the hydraulic pressure in the control pressure chamber is greater than an opening and closing switching pressure in a state in which the current to be supplied to the coil of the pressure-reduction linear valve is kept, and the opening and closing switching pressure is determined by the current to be supplied to the coil of the pressure-reduction linear valve, and
wherein the control-pressure-chamber stiffness reducer comprises a pressure-reduction linear valve controller configured to control the current to be supplied to the coil of the pressure-reduction linear valve to reduce the opening and closing switching pressure such that the opening and closing switching pressure is less in the case where the slip control device is in the operating state than in the case where the slip control device is in the non-operating state.

6. The hydraulic braking system according to claim 5,
wherein the rear-hydraulic-pressure control device comprises a target hydraulic pressure determiner configured to determine a target hydraulic pressure in the control pressure chamber based on a brake request, and
wherein the pressure-reduction linear valve controller comprises a target-hydraulic-pressure-change-based pressure-reduction linear valve controller configured to reduce the opening and closing switching pressure such that the opening and closing switching pressure is less when a tendency of the target hydraulic pressure in the control pressure chamber which is determined by the target hydraulic pressure determiner is a decreasing tendency than when the tendency of the target hydraulic pressure in the control pressure chamber which is determined by the target hydraulic pressure determiner is an increasing tendency.

7. The hydraulic braking system according to claim 4,
wherein the pressure-increase linear valve comprises a characteristic in which the pressure-increase linear valve is in an open state when the hydraulic pressure in the control pressure chamber is less than an opening and closing switching pressure in a state in which the current to be supplied to the coil of the pressure-increase linear valve is kept, and the opening and closing switching pressure is determined by the current to be supplied to the coil of the pressure-increase linear valve, and
wherein the control-pressure-chamber stiffness reducer comprises a pressure-increase linear valve controller configured to control the current to be supplied to the coil of the pressure-increase linear valve to increase the opening and closing switching pressure such that the opening and closing switching pressure is greater in the case where the slip control device is in the operating state than in the case where the slip control device is in the non-operating state.

8. The hydraulic braking system according to claim 7,
wherein the rear-hydraulic-pressure control device comprises a target hydraulic pressure determiner configured to determine a target hydraulic pressure in the control pressure chamber based on a brake request, and
wherein the pressure-increase linear valve controller comprises a target-hydraulic-pressure-change-based pressure-increase linear valve controller configured to increase the opening and closing switching pressure in the pressure-increase linear valve such that the opening and closing switching pressure in the pressure-increase linear valve is greater when a tendency of the target hydraulic pressure in the control pressure chamber which is determined by the target hydraulic pressure determiner is an increasing tendency than when the tendency of the target hydraulic pressure in the control pressure chamber which is determined by the target hydraulic pressure determiner is a decreasing tendency.

9. The hydraulic braking system according to claim 4,
wherein the rear-hydraulic-pressure control device comprises an opening controller configured to establish open states of both of the pressure-increase linear valve and the pressure-reduction linear valve when the hydraulic pressure in the control pressure chamber is within a set range determined by a target hydraulic pressure.

10. The hydraulic braking system according to claim 1,
wherein the slip control device comprises a slip controller configured to use a hydraulic pressure in the hydraulic-pressure producing device to control a hydraulic pressure in each of the plurality of brake cylinders such that a slip of each of the plurality of wheels provided respectively for the plurality of brake cylinders is kept within an appropriate range determined by a coefficient of friction of a road surface.

11. The hydraulic braking system according to claim 1,
wherein the slip control device comprises a pump device configured to pump up working fluid having flowed from at least one of the plurality of brake cylinders and supply the working fluid to the upstream portion, and the stiffness reducer is configured to reduce the stiffness in the upstream portion such that the stiffness in the upstream portion is less when the pump device is in an operating state than when the pump device is in a non-operating state.

12. The hydraulic braking system according to claim 2,
wherein the rear-hydraulic-pressure control device comprises (a) a rearward chamber pressure-increase linear valve provided between the rearward chamber and a high pressure source, and the rearward chamber pressure-increase linear valve being an electromagnetic valve comprising a coil, (b) a rearward chamber pressure-reduction linear valve provided between the rearward chamber and a low pressure source, the rearward chamber pressure-reduction linear valve being an electromagnetic valve comprising a coil, and (c) a rearward chamber hydraulic pressure controller configured to control a current to be supplied to the coil of the rearward chamber pressure-increase linear valve and a current to be supplied to the coil of the rearward chamber pressure-reduction linear valve to control the hydraulic pressure in the rearward chamber to control a hydraulic pressure in the front pressure chamber, and
wherein the rearward chamber hydraulic pressure controller comprises a direct rearward chamber stiffness reducer configured to control a current to be supplied to at least one of the coil of the rearward chamber pressure-increase linear valve and the coil of the rearward chamber pressure-reduction linear valve, to reduce the stiffness in the rearward chamber such that the stiffness in the rearward chamber is less in the case where the slip control device is in the operating state than in the case where the slip control device is in the non-operating state, and the direct rearward chamber stiffness reducer is comprised in the rearward chamber stiffness reducer.

13. The hydraulic braking system according to claim 1,
wherein the hydraulic-pressure producing device comprises: an upstream pressure-increase linear valve provided between the upstream portion and a high pressure source, the upstream pressure-increase linear valve being an electromagnetic valve comprising a coil; and an upstream pressure-reduction linear valve provided between the upstream portion and a low pressure source, the upstream pressure-reduction linear valve being an electromagnetic valve comprising a coil, and wherein the stiffness reducer is configured to control a current to be supplied to at least one of the coil of the upstream pressure-increase linear valve and the coil of the upstream pressure-reduction linear valve, to reduce a stiffness in the upstream portion.

\* \* \* \* \*